US011556702B2

(12) United States Patent
Logan et al.

(10) Patent No.: US 11,556,702 B2
(45) Date of Patent: Jan. 17, 2023

(54) ORCHESTRATION OF CRUD OPERATIONS FOR A HIERARCHICAL WEB SERVICE DATA MODEL IN A SPREADSHEET

(71) Applicant: Oracle International Corporation, Redwood Shores, CA (US)

(72) Inventors: Shaun Logan, Melrose, MA (US); Edmund A. Davis, Redwood City, CA (US); Brian Rowles, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 17/008,503

(22) Filed: Aug. 31, 2020

(65) Prior Publication Data

US 2022/0067271 A1 Mar. 3, 2022

(51) Int. Cl.
| | |
|---|---|
| *G06F 3/048* | (2013.01) |
| *G06F 40/18* | (2020.01) |
| *G06F 3/0481* | (2022.01) |
| *G06F 16/27* | (2019.01) |
| *H04L 67/1097* | (2022.01) |
| *G06F 16/23* | (2019.01) |
| *H04L 67/01* | (2022.01) |

(52) U.S. Cl.
CPC ............ *G06F 40/18* (2020.01); *G06F 3/0481* (2013.01); *G06F 16/2379* (2019.01); *G06F 16/273* (2019.01); *H04L 67/01* (2022.05); *H04L 67/1097* (2013.01)

(58) Field of Classification Search
CPC .... G06F 40/18; G06F 16/273; G06F 16/2379; G06F 3/0481; H04L 67/1097; H04L 67/42
See application file for complete search history.

(56) References Cited

U.S. PATENT DOCUMENTS

| | | | | |
|---|---|---|---|---|
| 8,205,010 | B1* | 6/2012 | Black | G06Q 10/00 |
| | | | | 709/246 |
| 10,467,593 | B2* | 11/2019 | White | G06Q 10/10 |
| 10,885,067 | B2* | 1/2021 | Taylor, III | G06F 16/26 |
| 11,042,699 | B1* | 6/2021 | Sayre | G06F 8/33 |
| 11,113,041 | B2* | 9/2021 | Stachura | G06F 8/34 |

(Continued)

*Primary Examiner* — David Phantana-angkool
(74) *Attorney, Agent, or Firm* — Trellis IP Law Group, PC

(57) ABSTRACT

Example embodiments facilitate orchestrating changes of data made (and/or actions specified for execution) in a client-side program with changes of corresponding data made in one or more server-side data objects. An example method includes structuring one or more worksheet relationships between one or more worksheets of a client-side spreadsheet in accordance with one or more data object relationships of one or more data objects of a server-side data structure; determining that one or more operations have been selected for performing on data of one or more of the worksheets; detecting user input operative to initiate performance of the one or more operations; and initiating implementation of the one or more operations (e.g., CRUD (Create, Read, Update, Delete) operations) in accordance with the one or more worksheet relationships and the one or more data object relationships (e.g., hierarchical relationships). A spreadsheet add-in may issue request messages to web services tasked with completing the one or more operations.

20 Claims, 23 Drawing Sheets

(56) References Cited

U.S. PATENT DOCUMENTS

| | | | | |
|---|---|---|---|---|
| 11,182,831 B1* | 11/2021 | Faradjev | ............... | H04L 67/146 |
| 11,308,098 B2* | 4/2022 | Poddar | .............. | G06F 16/24578 |
| 11,367,139 B2* | 6/2022 | Cunningham | ........ | G06F 40/221 |
| 2010/0205520 A1* | 8/2010 | Parish | .................... | G06F 40/18 |
| | | | | 715/212 |
| 2010/0211862 A1* | 8/2010 | Parish | .................. | G06F 16/957 |
| | | | | 715/212 |
| 2013/0013995 A1* | 1/2013 | Khen | ...................... | G06F 9/541 |
| | | | | 715/217 |
| 2014/0136937 A1* | 5/2014 | Patel | ....................... | G06F 40/18 |
| | | | | 715/212 |
| 2014/0149836 A1* | 5/2014 | Bedard | ................ | G06F 40/143 |
| | | | | 715/212 |
| 2014/0282013 A1* | 9/2014 | Amijee | ................ | G06F 3/0482 |
| | | | | 715/732 |
| 2016/0224536 A1* | 8/2016 | Thomas | .................. | G06F 40/18 |
| 2017/0098008 A1* | 4/2017 | Kemmer | ................. | G06F 40/18 |
| 2018/0107671 A1* | 4/2018 | Pleños | ............... | G05B 23/0272 |
| 2019/0057111 A1* | 2/2019 | Chung | .................. | G06Q 10/10 |
| 2019/0187962 A1* | 6/2019 | Stachura | ................... | G06F 8/38 |
| 2020/0042648 A1* | 2/2020 | Rao | ........................... | G06F 8/20 |
| 2020/0043091 A1* | 2/2020 | Courbage | ............ | G06Q 40/025 |
| 2020/0150938 A1* | 5/2020 | Stachura | ................. | G06F 40/18 |
| 2021/0313830 A1* | 10/2021 | Dowler | .................... | H02J 7/005 |
| 2021/0326520 A1* | 10/2021 | Davis | .................... | G06F 16/907 |
| 2021/0357582 A1* | 11/2021 | Davis | ..................... | H04L 67/22 |
| 2021/0397420 A1* | 12/2021 | Stachura | ................... | G06F 8/30 |

* cited by examiner

*Available Business Object Fields*

*Filter*

| Field ID | Field Title | Description | Data Type |
|---|---|---|---|
| ExpenseID | ExpenseID | | Integer |
| ExpenseReportID | Expense Report ID | | Integer |
| PartitionID | Partition ID | | String |
| Justification | Justification | | String |
| Amount | Amount | | Number |
| StartDate | Start Date | | DateTime |
| EndDate | End Date | | DateTime |
| ExpenseTypeID | Expense Type ID | | Integer |
| ExpenseSourceID | Expense Source ID | | Integer |
| RevisionNum | Revision Num | | Number |

Spreadsheet UI — 290

File  Home  Insert  Page Layout  Formulas  Data  Review  View  Builder — 124

132 — Clear   138 — Download Changes   140 — Upload Changes   142 — Table Column Manger   — 126   — 150

282 —   122 —

| | A | B | C | D | E | F |
|---|---|---|---|---|---|---|
| 0 | Change | Status | Expense ID* (Expenses) | Expense Item ID* | Start Date | End Date |
| 1 | | | 1001 | 11,101 | 06/15/92 | 06/16/92 |
| 2 | | | 1001 | 11,102 | 06/18/92 | 06/19/92 |
| 3 | | | 1001 | 11,103 | 06/21/92 | 06/22/92 |
| 4 | | | 1001 | 11,104 | 06/24/92 | 06/25/92 |
| 5 | | | 1001 | 11,105 | 06/27/92 | 06/28/92 |
| 6 | | | 1001 | 11,106 | 06/30/92 | 07/01/92 |
| 7 | | | 1001 | 11,107 | 07/03/92 | 07/04/92 |
| 8 | | | 1002 | 11,201 | 07/18/92 | 07/19/92 |
| 9 | | | 1003 | 11,202 | 08/18/92 | 08/18/92 |

| Expense Reports | Expenses | Itemizations | Payments | + |

*Choose Parent Row for Selected Create Rows* — 330

*Filter* — 332

| Expense ID | Justification | Amount | Start Date | End Date | Expense Type ID* | Expense Source ID* |
|---|---|---|---|---|---|---|
| 1001 | 1 of 10 | 1000 | 43951 | 43961 | Hotel | Corporate Card |
| 1002 | 2 of 10 | 1000 | 43951 | 43961 | Car Rental | Cash |
| 1003 | 3 of 10 | 1000 | 43951 | 43961 | Hotel | Personal Card |
| 1004 | 4 of 10 | 1000 | 43951 | 43961 | Car Rental | Venmo |
| 1005 | 5 of 10 | 1000 | 43951 | 43961 | Hotel | Paypal |
| 1006 | 6 of 10 | 1000 | 43951 | 43961 | Car Rental | Other |
| 1007 | 7 of 10 | 1000 | 43951 | 43961 | Hotel | Corporate Card |
| 1008 | 8 of 10 | 1000 | 43951 | 43961 | Car Rental | Corporate Card |
| 1009 | 9 of 10 | 1000 | 43951 | 43961 | Hotel | Corporate Card |
| 1010 | 10 of 10 | 1000 | 43951 | 43961 | Car Rental | Corporate Card |

334

Ok   Cancel

FIG. 17

Spreadsheet UI

File  Home  Insert  Page Layout  Formulas  Data  Review  View  Builder

Clear  Download Changes  Upload Changes  Table Column Manger

Expense Reports

Expense Report ID*: 15,001  Purpose: Special Event 2015
Final Approval Date:  Reporter ID*: Steven King
Approver ID:  Status ID: Pending
Partition ID*: Northeast  Revision Num:

| | A | B | C | D | E | F | G | H |
|---|---|---|---|---|---|---|---|---|
| 0 | Change | Status | Expense ID* | Justification | Amount | Start Date | End Date | Expense Type ID* |
| 1 | | | 1001 | 1 of 10 | 1000 | 04/30/20 | 05/10/20 | Hotel |
| 2 | | | 1002 | 2 of 10 | 1000 | 04/30/20 | 05/10/20 | Car Rental |
| 3 | | | 1003 | 3 of 10 | 1000 | 04/30/20 | 05/10/20 | Hotel |
| 4 | | | 1004 | 4 of 10 | 1000 | 04/30/20 | 05/10/20 | Car Rental |
| 5 | | | 1005 | 5 of 10 | 1000 | 04/30/20 | 05/10/20 | Hotel |
| 6 | | | 1006 | 6 of 10 | 1000 | 04/30/20 | 05/10/20 | Car Rental |

Expense Reports | Expenses | Itemizations | Payments | +

FIG. 20

ORCHESTRATION OF CRUD OPERATIONS FOR A HIERARCHICAL WEB SERVICE DATA MODEL IN A SPREADSHEET

CROSS REFERENCES TO RELATED APPLICATIONS

This application is related to the following applications: U.S. patent application Ser. No. 16/917,384, entitled CUSTOM ACTION INVOCATION IN A SPREADSHEET INTEGRATED WITH WEB SERVICE, filed on Jun. 30, 2020 (Trellis Ref. ORACP0260/ORA200498-US-NP) and U.S. patent application Ser. No. 16/145,029, entitled EDITABLE TABLE IN A SPREADSHEET INTEGRATED WITH A WEB SERVICE, filed on Sep. 27, 2018 (Trellis Ref. ORACP0205/ORA180186-US-NP) which are hereby incorporated by reference as if set forth in full in this application for all purposes.

BACKGROUND

The present application relates to computing, and more specifically to software, systems, and methods for using client-side software applications and accompanying User Interfaces (UIs) to use and/or interact with server-side computing resources, e.g., data and/or functionality.

Systems and methods for enabling client-side computing resources (e.g., data, devices, software functionality, etc.) and accompanying devices to use or interact with server-side computing resources are employed in various demanding applications, including mobile enterprise applications; cloud data storage services for personal computers; browsers for accessing financial websites and accounts, and so on. Such applications often demand efficient, versatile, and user friendly systems and methods that facilitate productivity and that can leverage preexisting user knowledge and intuition to facilitate improved user experience.

Efficient user friendly systems facilitating orchestration or interactions between client-side computing resources (e.g., personal computers, mobile devices, accompanying software, data, etc.) and server-side computing resources (e.g., cloud-based data storage, server-side software applications, etc.) can be particularly important in enterprise applications.

Enterprise applications often involve business users that are frequently interacting with business data, e.g., deleting data, updating data, and so on. Some of this data may be manipulated using client-side spreadsheets. However, conventionally, business users had difficulty updating server-side data responsive to changes they made to data in their client-side spreadsheets.

Furthermore, note that conventional spreadsheets often provide User Interfaces (UIs) with two-dimensional grids (also called tables or worksheets). However, server-side data is often intricately structured with multiple dimensions in accordance with specific data models characterizing relational databases or other types of databases.

As such, this has complicated the ability of spreadsheet users to efficiently and accurately update or manipulate intricately structured server-side data after changes are made to client-side spreadsheet data. Similarly, updating or manipulating client-side data in view of complex server-side data models can be equally problematic when using conventional approaches for Create, Read, Update, and Delete (CRUD) operations.

SUMMARY

Various embodiments discussed herein employ a spreadsheet add-in to facilitate orchestration and integration between a client-side spreadsheet and complex server-side data models. For instance, server-side data models may exhibit complex hierarchies of data, which may be arranged in different levels of constituent data objects of the hierarchies. The example add-in includes code for mapping and associating or relating client-side spreadsheets (e.g., of a given spreadsheet workbook, i.e., collection of worksheets) in accordance with information about complex server-side data hierarchies.

This facilitates various orchestration operations, such as synchronization, uploading locally made data changes to the appropriate data object of the data model, other CRUD (Create, Read, Update, Delete) operations, and so on. For instance, to implement changes to server-side data via a spreadsheet workbook having several worksheets in which changes or actions have been specified, the add-in traverses the hierarchy of worksheets in the workbook, and requests changes to corresponding data objects of the server-side hierarchy of the data model, via one or more request messages sent to one or more web services that expose operations on the data model for use by the add-in. Similarly, changes made to one or more levels of the server-side data hierarchy can be traversed via the add-in (in communication with one or more web services) to update the corresponding spreadsheet hierarchy.

An example method facilitates communications between a client-side spreadsheet and a server-side data storage mechanism, e.g., database characterized by a data model (also called a data structure herein). The example method includes determining one or more characteristics of an organization of a data structure of the server-side data storage mechanism; using the one or more characteristics to specify one or more relationships between client-side worksheets of a client-side spreadsheet, such that the one or more relationships are specified in accordance with the organization of the data structure; and employing the one or more relationships to facilitate one or more operations on data of the data structure via the client-side spreadsheet.

In a more specific embodiment, the method further includes facilitating the one or more operations on data of the data structure responsive to user input provided via one or more UI controls, e.g., an Upload and/or Download control, of the client-side spreadsheet.

The one or more operations may include one or more CRUD operations, and/or one or more custom actions. The step of employing the one or more relationships may further include using the one or more relationships to selectively synchronize data in the spreadsheet with data of the data structure. The organization of the data structure may include a hierarchy of data objects; wherein the hierarchy of data objects includes a tree structure; and wherein the one or more relationships between the client-side worksheets are described, at least in part, by the tree structure or a portion thereof.

The one or more relationships may match one or more associations between one or more data objects of the data structure, such that the one or more client-side worksheets are related as a hierarchy of worksheets, wherein the hierarchy of worksheets is based on the hierarchy of data objects. The step of employing may further include traversing the hierarchy of worksheets to selectively implement one or more actions specified in one or more of the worksheets to thereby perform actions specified in the one or more worksheets on corresponding data objects of the hierarchy of data objects.

Accordingly, hierarchically structured/related client-side worksheets and similarly structured server-side data models can now be efficiently operated on (e.g., via CRUD operations, including bulk operations) as though both client-side and server-side hierarchies are wired together and integrated. By integrating client-side spreadsheets with server-side or cloud-based data via one or more remote web services, spreadsheets can be configured (automatically or manually) to enable users to perform bulk operations on data, including custom actions, using a hierarchical data model exposed by the web service, thereby greatly extending functionality conventional spreadsheets and associated two-dimensional worksheets.

Certain embodiments provide user-friendly mechanisms for retrieving rows of a rich hierarchy of business data entities (e.g., objects) into several worksheets with a single gesture; then packaging any changes made across the worksheet hierarchy, and submitting them to the web service, with no manual management of data relationship keys required.

With the automatic orchestration of operations (e.g., CRUD operations and/or custom actions) across and down a rich hierarchy of business objects in a client-side spreadsheet, the end user no longer needs to manually manage data relationship key values, which can be error-prone, inefficient, and time-consuming. Certain embodiments discussed herein provide significant usability enhancements and reduce the overall error rate and time-to-completion of spreadsheet-related tasks.

At each child, sibling, grandchild, etc. level of the hierarchy of worksheets (that match part or all of a server-side hierarchy of a data model, where each worksheet corresponds to a particular data object(s) at a corresponding level of the data model hierarchy), the add-in can retrieve (from the server, via the web service) all rows for all parent rows. Users may then use their client-side spreadsheets to analyze, filter, sort, graph, insert, and edit all data in their resultant worksheet hierarchy. User selection of an upload button (or other suitable UI control) may cause the add-in to send (to the cloud-based data storage mechanism) all changes (updates, creates, deletes, etc.) across the entire data object hierarchy (e.g., business object hierarchy) in a single operation.

This can represent a major efficiency enhancement for the user, e.g., accountant, who would otherwise need to perform multiple queries, multiple downloads, and may need to copy/paste the resultant rows into a temporary sheet for analysis. Without use of embodiments discussed herein, such operations may be limited, for practical purposes, to a single table, where that table would only contain items for a single parent object.

Accordingly, certain embodiments discussed herein enable or facilitate a complex business object hierarchy to be expressed across multiple related client-side worksheets of a given client-side spreadsheet program. A spreadsheet add-in facilitates simple (e.g., automatic) spreadsheet configuration to create dependent worksheets of a given hierarchically structured workbook.

Certain embodiments provide powerful capabilities for operating (e.g., using CRUD operations) on all child rows for all parent items in a single workbook of hierarchically structured worksheets. Accordingly, users can now easily perform bulk operations (e.g., download, edit, insert, delete, upload, etc.) and/or custom actions across an entire server-side business object hierarchy.

A further understanding of the nature and the advantages of particular embodiments disclosed herein may be realized by reference of the remaining portions of the specification and the attached drawings.

BRIEF DESCRIPTION OF THE DRAWINGS

FIG. 12 illustrates an eighth example UI display screen, which may be displayed after user selection of an edit UI control (e.g., pencil icon) in the seventh example UI display screen of FIG. 11, and which provides user options to select one or more columns from a parent worksheet (e.g., Expenses worksheet or table) to show in the current child worksheet (e.g., Itemizations worksheet).

FIG. 14 illustrates a tenth example UI display screen representing the ninth example UI display screen of FIG. 13 after user selection of a download control from the ninth example UI display screen of FIG. 13.

FIG. 17 illustrates a thirteenth example UI display screen showing (also called a picker UI) user options (e.g., in a list) to pick and assign a parent column to a row (or many selected rows) that are pending a Create operation.

FIG. 20 illustrates a sixteenth example UI display screen showing an example form-over-table worksheet, which may be used with embodiments discussed herein.

DETAILED DESCRIPTION OF EMBODIMENTS

Figure 1:
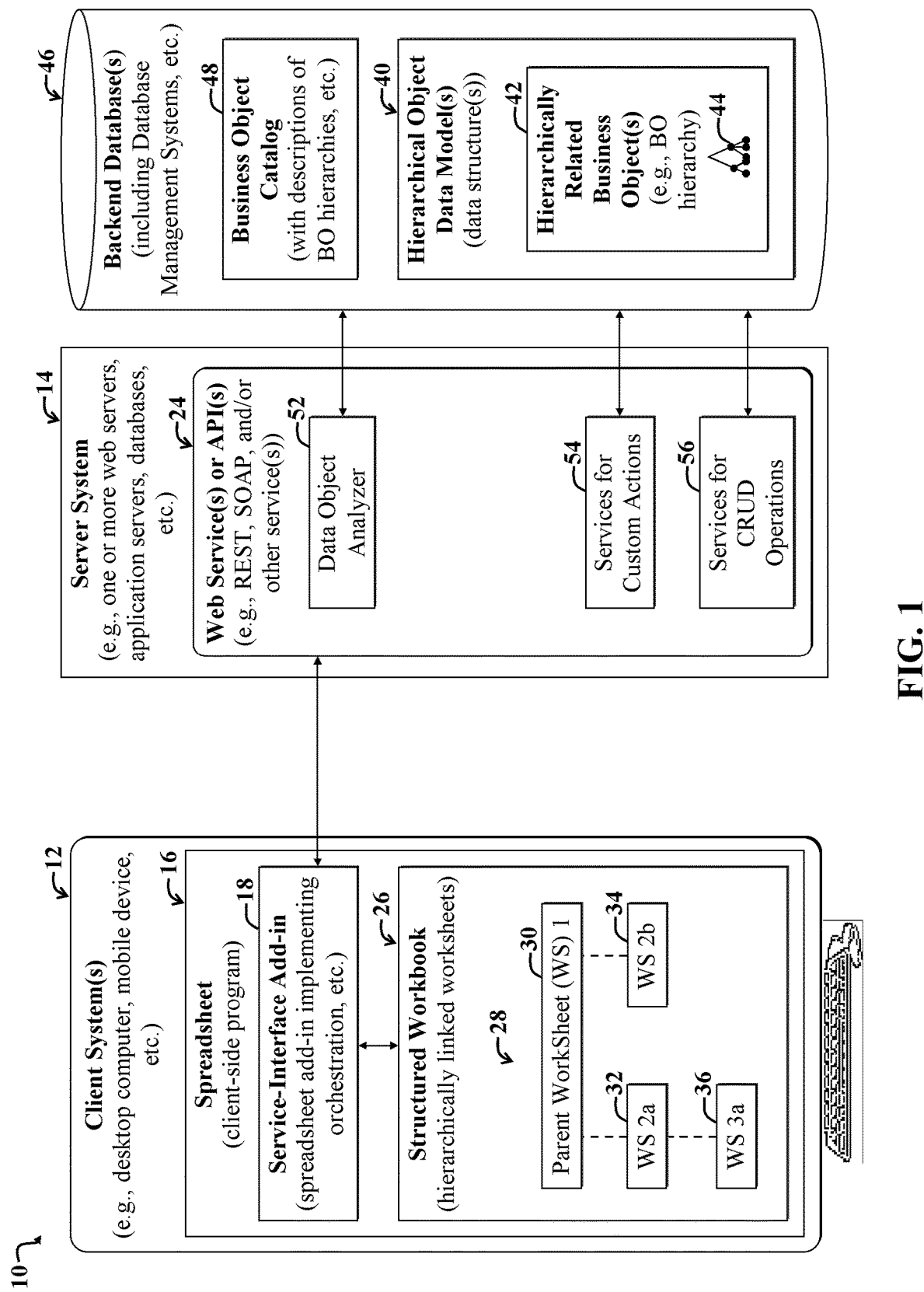
FIG. 1 illustrates a first example system and accompanying computing environment employing a client-side spreadsheet add-in for interacting with web services to facilitate operations, e.g., Create, Read, Update, and Delete (CRUD) operations, on multi-dimensional hierarchically structured server-side data using a similarly structured arrangement of associated worksheets.

For the purposes of the present discussion, an object, such as a data object, may be any grouping of or encapsulation of data and/or functionality. Examples of objects include classes or structures implemented via object-oriented programming languages; tables, rows, or records of a database; and so on.

Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment.

A business object may be any object used to organize information for business purposes. Data that is associated with a business object may be contained within a data structure or database associated with the object, or the information may be distributed among different applications, computers, and so on, without departing from the scope of the present teachings.

A hierarchy may be any ordering of or arrangement of data, where different data in the arrangement may exhibit superior or subordinate relationships with other data. A hierarchy may refer to a displayed representation of data objects or may refer to data and accompanying relationships existing irrespective of the representation.

Hierarchical relations may be "immediate", i.e. where the hierarchical levels of two data items differ by one (1). In such a case, the data item with the higher hierarchical level may be called the "parent" or "immediate ancestor" and the data item with the lower hierarchical level may be called the "child" or "immediate descendant". Hierarchical relations may be "remote", i.e. where the hierarchical levels of two data items differ by two (2) or more. In such a case, the data item with the higher hierarchical level may be called the "remote ancestor" (such as a "grandparent") and the data item with the lower hierarchical level may be called the "remote descendant" (such as a "grandchild"). Data items on the same hierarchical level may be called "hierarchical peers" or "siblings."

A data model may be any structure (e.g., data structure) or format characterizing an organization of data. The data may be organized in data objects, where certain relationships may occur between the data objects. These relationships may be considered part of the data model. A data model may further include a description of the objects, where the description specifies a collection of concepts and rules used in defining the structure of the data model. For example, a certain data model may employ relations and tuples between database records and fields. Data models are often specified graphically, e.g., using data modeling notation.

Note that, when business users, e.g., enterprise personnel, edit their business data with a spreadsheet (e.g., Microsoft Excel®), that is integrated with a remote data service, they may appreciate the ability to perform CRUD operations against a hierarchy of business objects.

For example, accounting users may use a spreadsheet to work on data of an Expense Reports business object. The Expense Reports business object may have sub-objects, e.g., child objects, grandchild objects, and so on.

For example, an Expense Reports object may have a set of individual Expenses objects as child objects (i.e., also called children), a set of Participants objects as other child objects; and the Expenses object may have one or more Itemizations object children. The business user may wish to naturally and efficiently act on all data in the server-side data hierarchy using their client-side spreadsheet program.

Conventionally, in theory, a business user could manage several spreadsheets, and copy and paste data relationship keys between them. The business user, e.g., manager, accountant, etc., might then perform multiple queries, multiple downloads, and copy/paste the resultant rows into a temporary sheet for analysis before completing changes, updates, etc.

Generally, the need to manually manage data relationship key values, perform multiple queries, and so on, is error prone, inefficient, and time consuming, especially when working with many potentially large spreadsheets. Accordingly, for manageability, business users often limit standard editing operations to one or two resources (e.g., corresponding to rows or groups of rows) on a single spreadsheet or worksheet.

Various embodiments discussed herein overcome such inefficiencies by facilitating orchestration between client-side spreadsheets and server-side data models using a client-spread-sheet add-in, as discussed more fully below.

Generally, software developers, configuration managers, deployment managers, and other users of a computing environment may subscribe to certain cloud services to facilitate development, configuration, and deployment of software applications and storage of associated files.

For the purposes of the present discussion, a server may be any computing resource, such as a computer and/or software that is adapted to provide content, e.g., data and/or functionality, to another computing resource or entity that requests it, i.e., the client. A client may be any computer or system, including software system that is adapted to receive content from another computer or system, called a server. A server system may be any collection of one or more servers and accompanying computing resources. The terms "client device" and "client" may be employed interchangeably herein, however, depending upon the context in which the term is used, the term client may refer more generally to both client devices and client software.

A computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Embodiments discussed herein generally related to systems and methods for using software (called client-side software herein) running on a desktop computer, mobile device, or other computer system to authenticate with and access data, update, or otherwise use any functionality provided by web services, e.g., REpresentational State Transfer (REST) services or Application Programming Interfaces (APIs)

For the purposes of the present discussion, a custom action may be any software action implemented via code that has been developed or modified for a particular customer. Depending upon the context in which the term is used, the term custom action may refer to the software action or the code that implements the software action.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, implementing a step of a process-based software application and so on. The terms "software action" and "action" are employed interchangeably herein.

Certain embodiments discussed herein are particularly useful for enabling use of client-side spreadsheets, such as Excel, to provide input (including bulk input and implementing bulk operations) to server-side process-based software applications, thereby launching/driving the process-based software applications.

A spreadsheet may be any software application, such as Microsoft Excel®, or other spreadsheet, for facilitating organization and use of data via tables. Depending upon the context in which the term is used, a spreadsheet may also refer to a document produced by the software application, or may refer to a table shown in a UI display screen of the software application. Alternatively, the term worksheet may refer to particular tables or sections of a spreadsheet UI. A workbook may refer to a collection of one or more worksheets.

Although reference may be made to specific types of spreadsheet programs, e.g., Microsoft Excel, Google Sheets, Open Office, etc., it should be apparent that features of the embodiments can be adapted for use with any suitable spreadsheet program.

A process-based software application may be any software application definable by one or more sequences of steps, also called software activities. A sequence of steps (e.g., as may be involved in an approval flow, for instance) of a process-based software application may be called a process flow. Process flows are often modeled and illustrated via swim lanes in a User Interface (UI) display screen. Process-based applications are often implemented via composite applications that may leverage different web services for different process steps.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

For clarity, certain well-known components, such as the Internet, hard drives, processors, power supplies, routers, Internet Service Providers (ISPs), workflow orchestrators, process schedulers, identity management clouds, process clouds, certificate authorities, business process management systems, database management systems, middleware, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a client-side spreadsheet 16 and accompanying service-interface add-in 18 to interact with web services or Application Programming Interfaces (APIs) to facilitate operations, e.g., CRUD operations, on multi-dimensional hierarchically structured server-side data (e.g., corresponding to a hierarchical object data model 40) using a similarly multi-dimensional hierarchically related arrangement of spreadsheets (e.g., corresponding to a hierarchy of worksheets 28).

The first example system 10 includes one or more client systems 12 (e.g., desktop computer, mobile device, etc.) in communication with a server system 14 via a network, such as the Internet. The server system 14 communicates with one or more backend databases 46. The server system 14 runs one or more web services or APIs 24, which facilitate interaction between the one or more client systems 12 and data and functionality maintained or provided via the backend databases 46.

The example client system(s) 12 includes a spreadsheet 16 (also called the client-side spreadsheet) with a service-interface add-in 18 and structured workbook 26.

The example web services 24 (also called cloud-based services) of the server system 14 include a data object analyzer 52, one or more services for facilitating implementing custom actions 54, and one or more services 56 for facilitating implementing CRUD operations.

The example backend databases 46 include a business object catalog 48 and one or more hierarchical object data models (also called data structures herein).

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while the backend databases 46 are shown separately from the server system 14, the backend databases 46 may be part of the server system 14, without departing from the scope of the present teachings.

For instance, while the business object catalog 48 and hierarchical object models 40 may be implemented by a relational database that is used for persistence of the hierarchical object data models 40 and accompanying data, other embodiments are possible. For instance the business object catalog 48 hierarchical object data models 40 may be implemented in the server system 14, e.g., via one or more web services and/or APIs 24, and/or other module in communication therewith.

For example, a separate box (i.e., separate from the web services or APIs 24) may represent a module that incorporates functionality for communicating with, managing, and/or exposing the business object catalog 48 and accompanying hierarchical object data models 40 to the one or more client systems 12. The backend database(s) 46 may influence the hierarchy, but, alternatively, may be used only for storage of data. Accordingly, in this example case, the business object data models 40 and accompanying hierarchies 44 can be implemented, in whole or in part, via one or more modules running on the server system 14.

In the present example embodiment, the backend databases 46 include business objects 42 that are hierarchically related in accordance with the hierarchical object data model 40; graphically depicted here via a data hierarchy 44. For instance, a given parent object may have one or more child objects (called children), and the children may also have one or more child objects, and so on, as discussed more fully below.

The client-side structured workbook 26 of the spreadsheet 16 has been configured with client-side hierarchy 28 of worksheets, including a parent WorkSheet (WS) 30, a first child worksheet (WS 2a) 32, a second child worksheet (WS 2b) 34, and a grandchild worksheet (WS 3a) 36. These worksheets 30-36 of the structured workbook 26 have been associated, related, or otherwise linked to each other to establish the client-side hierarchical structure 28.

Associations, relations, or links between the worksheets 30-36 and construction of the worksheets 30-36 can be automatic and/or manual. During automatic configuration, the service-interface add-in 18 obtains or accesses information about the server-side hierarchical object data model 40 and accompanying business objects 42 and hierarchical relationship structure 44 (also called server-side hierarchy herein).

The service-interface add-in 18 may obtain this descriptive information describing the server-side hierarchy 44 and associated business object model 40 responsive to one or more request messages sent by the service-interface add-in 18 to the data object analyzer 52.

The data object analyzer 52 may be a service that selectively accesses a business object catalog 48, which contains descriptive information, e.g., descriptions of business object hierarchies 42 and data models 40, of the backend databases 46. The descriptive information can include relationship keys describing, for instance, how each of the hierarchically related business objects 42 are related to each other (e.g., parent object, child object, sibling object, grandchild object, and so on).

The data object analyzer 52 then delivers a response message with the descriptive information to the service-interface add-in 18 responsive to the request message issued therefrom. The service-interface add-in 18 includes code for automatically constructing the structured workbook 26 and generating the initial worksheets 30-36.

The worksheets 30-36 are then related to each other so that the worksheet hierarchy 28 models a portion of, e.g., a subset of, (or all of, depending upon a given implementation) server-side hierarchy 44. Hence, the structure of the worksheet hierarchy 28 (also called client-side hierarchy herein) matches a portion of the structure 42 that includes data objects with data corresponding to data of the worksheets 32-36 at similar levels of the data structure 40.

Note that the service-interface add-in 18 may include computer code for controlling certain UI functionality of the spreadsheet 16. For instance, during manual structuring of relationships among the worksheets 30-36, a user may access one or more menus for selecting parent worksheets for given worksheets, and so on.

The service-interface add-in 18 may control the availability of certain user options in such menus. For instance, the service-interface add-in 18 may reference knowledge of the server-side hierarchy 44 to ensure that inappropriate relationships between the worksheets 30-36 are not established, i.e., menu options for such are not provided during a manual configuration mode.

Structuring relationships between the worksheets 30-36 in accordance with the server-side hierarchy 44, which characterizes the hierarchically related business objects 42 of the hierarchical object data model 40, facilitates consistent interaction, synchronization, orchestration, including CRUD operations, which can now readily be implemented across complex data object hierarchies 44 via a user-friendly UI of the spreadsheet 16, as discussed more fully below.

Figure 2:
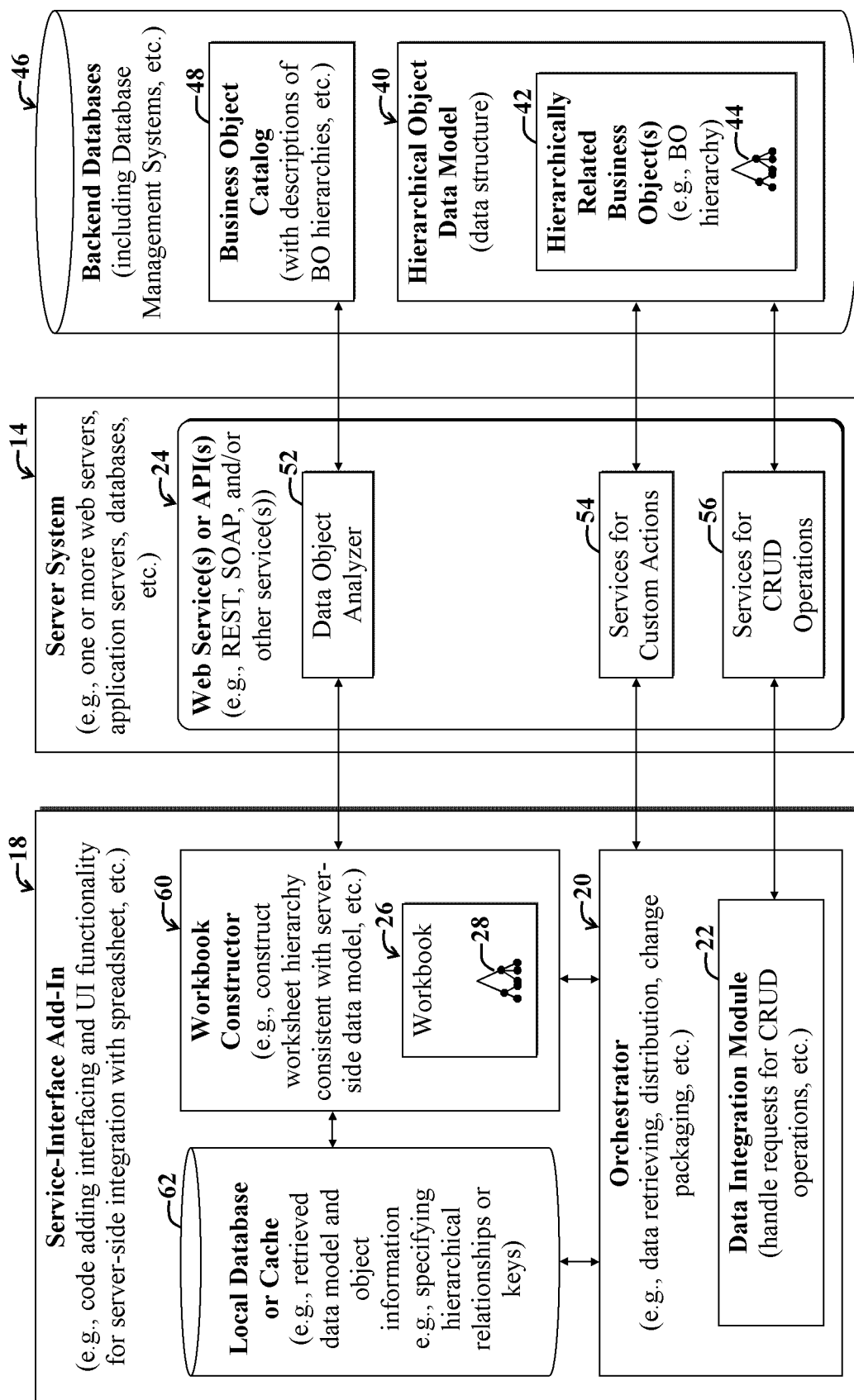
FIG. 2 illustrates additional detail of the service-interface add-in of the spreadsheet of the first example system and accompanying computing environment of FIG. 1.

FIG. 2 illustrates additional detail of the service-interface add-in 18 of the spreadsheet 16 of the first example system 10 and accompanying computing environment of FIG. 1. For clarity, certain items, such as the client system 12 and the spreadsheet 16 of FIG. 1 are not explicitly called out in FIG. 2.

With reference to FIGS. 1 and 2, the example service-interface add-in 18 includes an example workbook constructor module 60 in communication with the web services 24, and in particular, the data object analyzer 52 thereof. The workbook constructor 60 includes code for selectively calling the data analyzer 52 to obtain information about the hierarchical object data model 40 and accompanying hierarchically related business objects 42, in addition to information about the server-side hierarchy 44 itself, including relationships between constituent objects and sub-objects thereof.

The data object analyzer 52 may include code for checking the business object catalog 48 for suitable descriptions of the hierarchical object data model 40, and then retrieving the descriptions, so as to fulfill requests for such descriptions (which may include relationship keys identifying and describing relationships between different objects 42 of the hierarchical object data model 40) issued by the client-side workbook constructor 60.

The descriptions of the objects 42 of the hierarchical object data model 40 and accompanying objects 42 and hierarchies can then be stored in a local database or cache 62 for use by the workbook constructor 60 when constructing the worksheet hierarchy 28 for use with the structured workbook 26 and accompanying spreadsheet program 16 of FIG. 1.

When building the worksheet hierarchy 28, the workbook constructor 60 uses the information describing the data model 40 (e.g., as may be obtained from the data object analyzer 52 and business object catalog 48, or as may be retrieved from the local database or cache 62 if already stored there) to construct the worksheet hierarchy 28 (shown in more detail in FIG. 1) using descriptive parameters or attributes that establish hierarchical relationships between the worksheets 30-36 of FIG. 1, such that the spreadsheet hierarchy 28 parallels or mimics a portion of the server-side hierarchy 44.

With reference to FIGS. 1 and 2, each of the different worksheets 30-36 of FIG. 1 may be associated with a corresponding server-side data object of the server-side hierarchically related business objects 42. For instance, during workbook construction by the workbook constructor 60 of FIG. 2, the parent worksheet 30 and data therein may correspond to a parent object of the hierarchically related business objects 42. Similarly, the first child worksheet 32 may correspond to a first child object of the parent object of the hierarchically related business objects 42, as discussed more fully below.

The service-interface add-in 18 includes an orchestrator module 20 and accompanying data integration module 22. The example orchestrator 20 includes code for facilitating implementation of orchestration of operations, e.g., CRUD operations, data synchronizations, implementation of custom actions (e.g., using data/parameters input from the spreadsheet 16 of FIG. 1), and so on, between the client-side spreadsheet 16 of FIG. 1 and the server-side hierarchical object data model 40, via strategic use of the web services 24.

Furthermore, in the present example embodiment, the orchestrator module 20 of the service-interface add-in 18 communicates with the local database or cache 62 and the workbook constructor 60. The orchestrator 20 includes code for performing various functions, such as determining any changes or scheduled actions to any portions of the worksheets of the worksheet hierarchy 28 of FIGS. 1 and 2; then determining when a user has selected to implement the changes (e.g., by detecting selection of an upload button, as discussed more fully below); then traversing the worksheet hierarchy 28 to package proposed changes, actions, operations, etc. into one or more request messages.

The one or more request messages are then sent to the web services 24, e.g., to the one or more services for implementing CRUD operations 56, and/or to the one or more services for implementing custom actions 54.

The request messages sent from the orchestrator 20 and accompanying data integration module 22 to the web services 14 may include descriptive information indicating to the web services 54, 56, which particular level and which particular business objects of the server-side hierarchy 44 is/are to be operated on in accordance with the one or more request messages issued by the orchestrator 20 and/or accompanying data integration module 22.

The web services 54, 56 may return status information, e.g., indicating whether or not a particular operation or action was successfully completed or not. This status information may then be subsequently displayed in the workbook 26 and associated spreadsheets 30-36 of FIGS. 1 and 2.

The orchestrator 42 may also access the local database or cache 62 to determine descriptive information of the server-side hierarchically related business objects 42 and the client-side hierarchy 28 of worksheets, and may then use that descriptive information to facilitate selectively updating the workbook 26 and accompanying worksheets 30-36.

For instance, if the orchestrator 20 determines that a user would like to download data for a parent worksheet (e.g., the worksheet 30) of FIG. 1 (e.g., in response to user selection of a download button), the orchestrator 30 may determine that the parent worksheet 30 represents a parent node worksheet (e.g., with reference to the local database or cache 62). Accordingly, when issuing a request message to the services for CRUD operations 56, the request message issued by the orchestrator 20, 22 may include descriptive information specifying retrieval of data from the corresponding (to the parent worksheet 30 of FIG. 1) parent data object of the server-side hierarchy 44.

Also note that in certain embodiments, if a given workbook includes worksheets that have not yet been populated with data, user selection of a download button may populate all of the worksheets 30-36 with corresponding data from the hierarchical object data model 40, and data from different objects of that object data model 40 will be positioned into corresponding worksheets 30-36 at the corresponding hierarchical level, as discussed more fully below.

Figure 3:
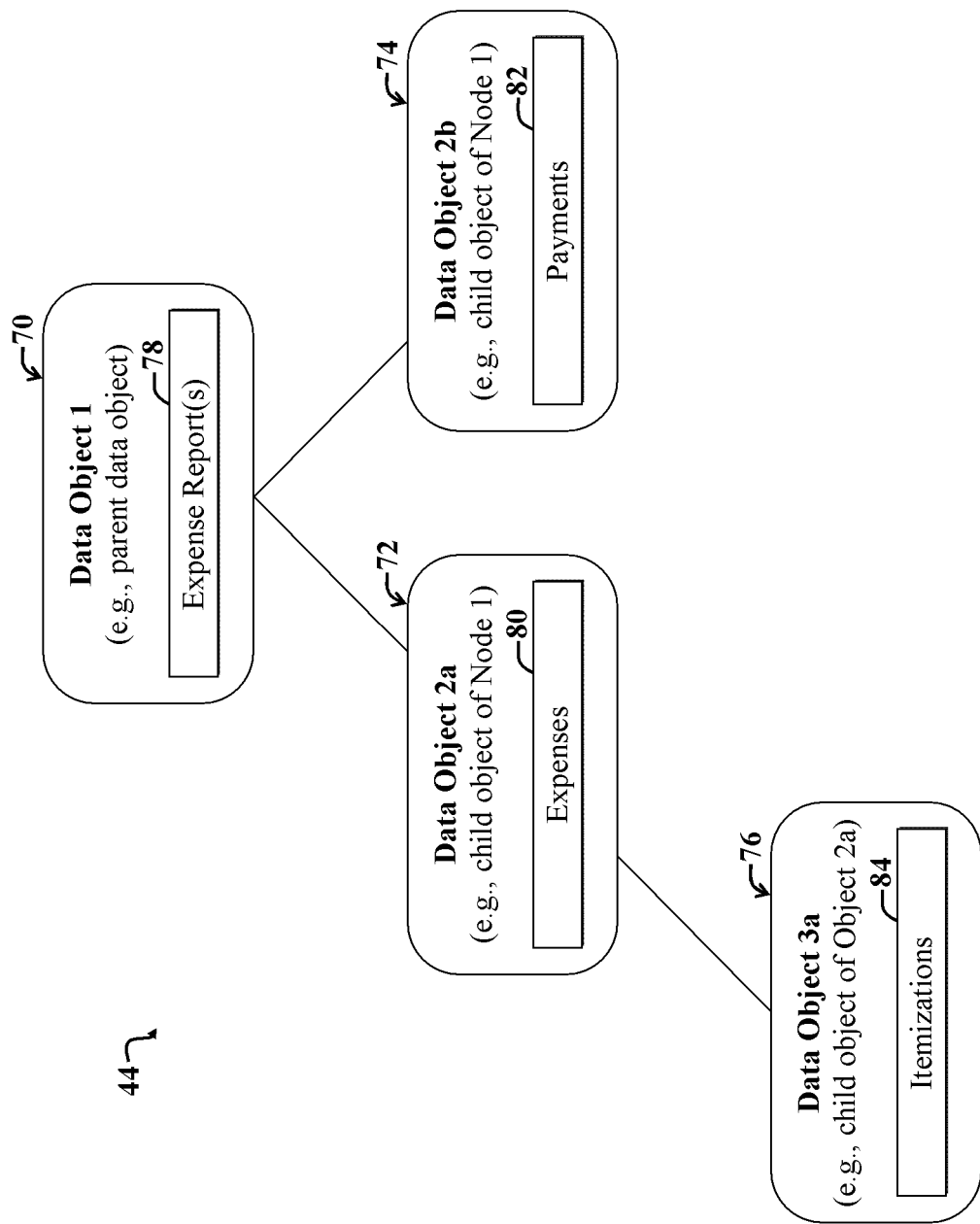
FIG. 3 illustrates an example data hierarchy characterizing an arrangement of server-side business objects of a server-side data structure (also called data model herein) and a corresponding worksheet hierarchy, i.e., arrangement of related client-side worksheets of a spreadsheet program.

FIG. 3 illustrates an example data hierarchy 44 characterizing an arrangement of server-side business objects of a server-side data structure (e.g., represented by the hierarchical object data model 40 of FIGS. 1 and 2) and a corresponding worksheet hierarchy (e.g., represented by the client-side hierarchy 28 of FIGS. 1 and 2), i.e., arrangement of related client-side worksheets 30-36 of a spreadsheet program, such as the spreadsheet 16 of FIG. 1.

For the purposes of the present discussion, a hierarchical object may be any object used to encapsulate data in a data hierarchy. A tree may be any data structure characterized by one or more hierarchies.

Tree hierarchies are often characterized by a group of related nodes, such as attributes, dimensions, labels, data objects, etc., which may be arranged in levels, where higher levels are characterized by nodes that exhibit superior relationships relative to nodes of lower levels. Higher level nodes are called parents, grandparents, etc., of related lower level nodes, e.g., child nodes, grandchild nodes, and so on.

A tree hierarchy, also called tree structure herein, may exhibit nodes corresponding to data dimensions and/or leaf data. Leaf data may represent data of the lowest level node (called a leaf node) along any branch of the tree structure, such that the leaf node lacks any child nodes.

Tree hierarchies, also called data hierarchies herein, may be categorized as explicit and/or implicit hierarchies. Explicit hierarchical representations of data are organized according to hierarchical relationships inherent within the data. Such hierarchical relationships are often based on persistent data attributes characterizing the data. An example of an explicit hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

Example hierarchically related data objects 70-76 are also called Business Objects (BOs) in the present example scenario, such that the example hierarchy 44 represents a BO hierarchy.

The example data hierarchy 44 includes a first parent object 70. In the present example scenario, the first data object 70 contains data pertaining to Expense Reports 78.

The first parent object 70 includes two child objects, e.g., a first child data object (2a) 72 and a second child object (2b) 74. The first child object 72 contains data pertaining to Expenses 80. The second child object 74 contains data for Payments 82.

The first child object 72 has a child object (3a) 76, which represents a grandchild object 72 of the parent data object 70. The grandchild object 76 contains data for Itemizations 84.

Note that data 78-84 of the respective hierarchically related data objects 70-76 is naturally hierarchically related. For example, in certain scenarios, the Expense Reports 78 contain or incorporate information about Expenses 80 and Payments 82. And, Expenses 80 are further characterized by or include Itemizations 84.

Note that the example data object hierarchy 44 may be called a tree hierarchy. In addition, or alternatively, the hierarchical relationships illustrated in the data object hierarchy 44 may be visualized using nesting. In such a scenario, the parent data object 70 may "contain" the sub-objects 72-76. Each of the data objects 70-76 may represent hierarchical objects.

With reference to FIGS. 1-3, note that previously, a user might have a collection of independent worksheets in a given workbook. Each worksheet would effectively operate in a silo and be focused on a particular task. However, embodiments discussed herein recognize server-side data object (e.g., BO) hierarchies; then leverage knowledge of the organization of the hierarchies and the data contained at each of the hierarchies, to facilitate enhanced interoperability of the server-side (e.g., cloud-based) data and functionality with server-side spreadsheets.

Note that the client-side hierarchy 28 of worksheets 30-36 in FIG. 1 exhibits a similar structure as the server-side BO hierarchy 44 of FIGS. 1-3. Accordingly, the parent worksheet 30 of FIG. 1 may represent or accommodate Expense Reports data, corresponding to the Expense Reports data 78.

Similarly, the first child worksheet 32 of the client-side hierarchy 28 of FIG. 1 may contain or handle Expenses data, corresponding to the Expenses data 80 of the first child data object 72 of FIG. 3.

The second child worksheet 34 of FIG. 1 may contain Payments data, corresponding to the Payments data 82 of the first child data object 74 of FIG. 3

Similarly, the grandchild worksheet 36 of FIG. 1 may contain Itemizations data, corresponding to the Itemizations data 84 of the grandchild data object 76 of FIG. 3.

Note that when a user schedules certain changes or actions (e.g., updates, deletes, custom actions, etc.) on certain rows, groups of rows, cells, or other portions of the worksheets 30-36 of FIG. 1, the orchestrator 20 and accompanying data integration module 22 of FIG. 2 may inspect the respective business object(s) and collect information.

For example, the orchestrator 20 of FIG. 2 may access the local database or cache 62 of FIG. 2 (and/or the business object catalog 48 via the data object analyzer 52 of FIG. 12); determine any of its children; and so on. The orchestrator 20 can use such a process to build a map of hierarchical relationships of the client-side sheets 28 and corresponding server-side hierarchy 44. The map then facilitates enabling the orchestrator 20 of FIG. 2 to coordinate operations between different levels of the client-side worksheet hierarchy 28 and corresponding data objects at hierarchically related levels, as maintained in a similarly structured/related server-side hierarchy 44.

Figure 4B:
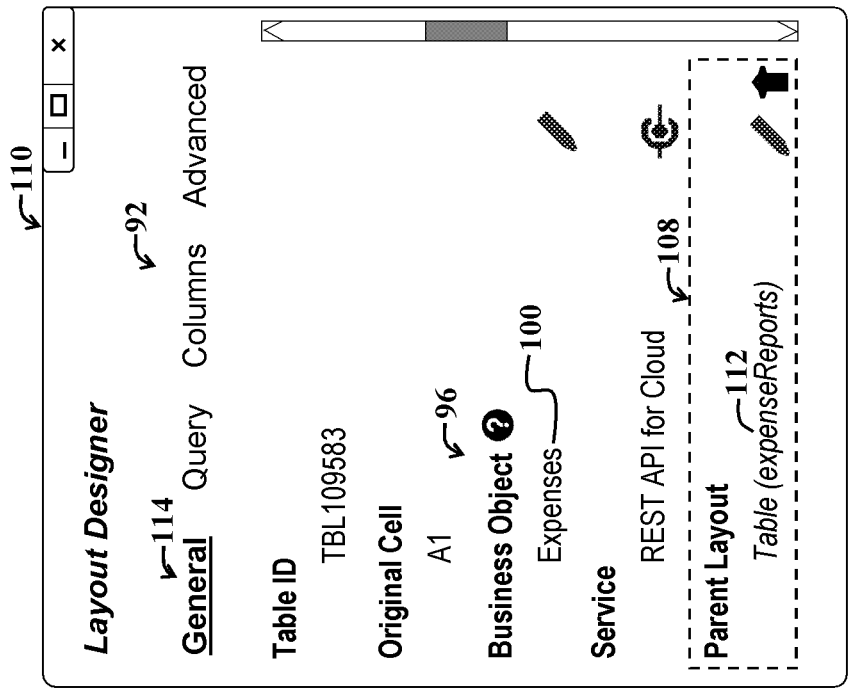
FIG. 4B illustrates a second example UI display screen representing the first UI display screen of FIG. 4A after a child worksheet has been hierarchically associated with a parent worksheet.
Figure 4A:
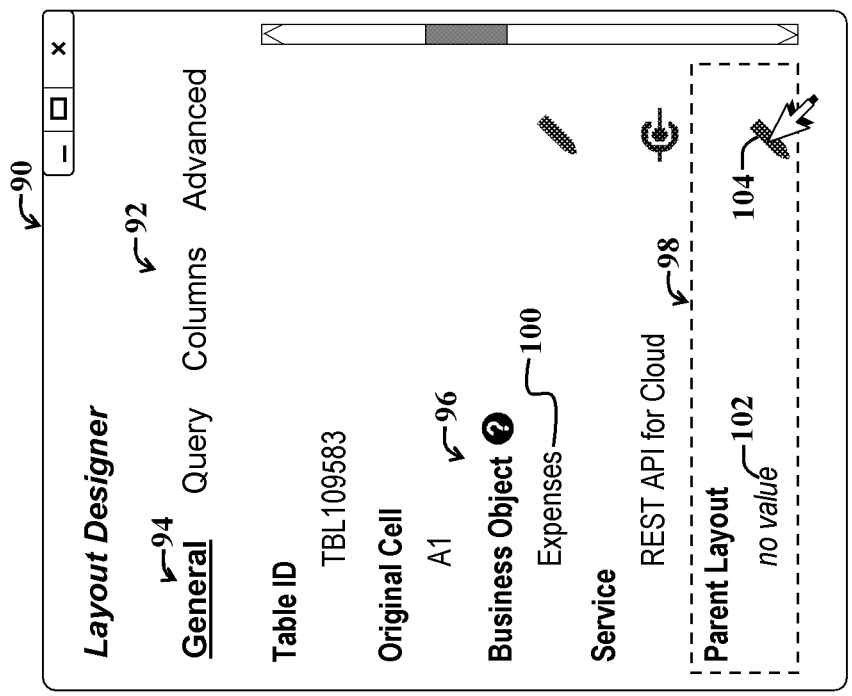
FIG. 4A illustrates a first example User Interface (UI) display screen for configuring the spreadsheet and accompanying add-in of FIG. 1 for specifying a hierarchical relationship between worksheets of a workbook, where the hierarchical relationship is similar to the hierarchical relationship of corresponding server-side data objects.

FIG. 4A illustrates a first example User Interface (UI) display screen 90 for configuring the spreadsheet 16 and accompanying add-in 18 of FIG. 1 for specifying a hierarchical relationship between worksheets of a workbook (e.g., worksheets 30-36 of the structured workbook 26 of FIG. 1), where the hierarchical relationship (e.g., client-side hierarchy 28) is similar to the hierarchical relationship (e.g., server-side hierarchy 44) of corresponding server-side data objects (e.g., the hierarchically related business objects 42 of FIGS. 1-2).

The first example UI display screen 90 represents a Layout Designer dialog box, with several tabs 92, including a currently selected General tab 94. The General tab 94 shows various attributes of the table or worksheet (e.g., Table ID TBL109583) from which the Layout Designer 90 was launched. Note that the Layout Designer 90 can be accessed via one or more UI controls of the spreadsheet 16 of FIG. 1, as discussed more fully below.

For illustrative purposes, the General tab 94 includes a Business Object section 96, with an object indicator 100 indicating the business object, i.e., Expenses 80, corresponding to the first child object 72 of FIG. 1 that is currently associated with the identified table or worksheet (e.g., the first child worksheet 32 of FIG. 1).

A Parent Layout section 98 includes an edit UI control 104 for specifying a parent layout for the current worksheet (e.g., Expenses worksheet). Currently, the Parent Layout section 98 indicates "no value" 102 for the Parent Layout section 98. Accordingly, the underlying Expenses worksheet (e.g., corresponding to the first child worksheet 32 of FIG. 1) is currently not linked or associated with a parent object. Accordingly, in the present example scenario, a user selects the edit UI control 104, which then provides one or more user options for specifying a value to replace the "no value" 102 entry in the Parent Layout section 98.

FIG. 4B illustrates a second example updated UI display screen 110 representing the first UI display screen 90 of FIG. 4A after a child worksheet (e.g., the first child worksheet 32 of FIG. 1) has been hierarchically associated with a parent worksheet (e.g., the parent worksheet 30 of FIG. 1).

In the present example use case scenario, an updated General tab 114 includes an updated Parent Layout section 108, which has been updated to specify that the parent layout of the current layout (e.g., corresponding to the current worksheet, e.g., the first child worksheet 32 of FIG. 1) is a table with the description of "expenseReports" 112. Accordingly, the description 112 describes the parent worksheet or layout 30 of FIG. 3, data of which corresponds to the parent data object 70 of FIG. 3, which includes data describing or pertaining to Expense Reports 78.

Figure 5:
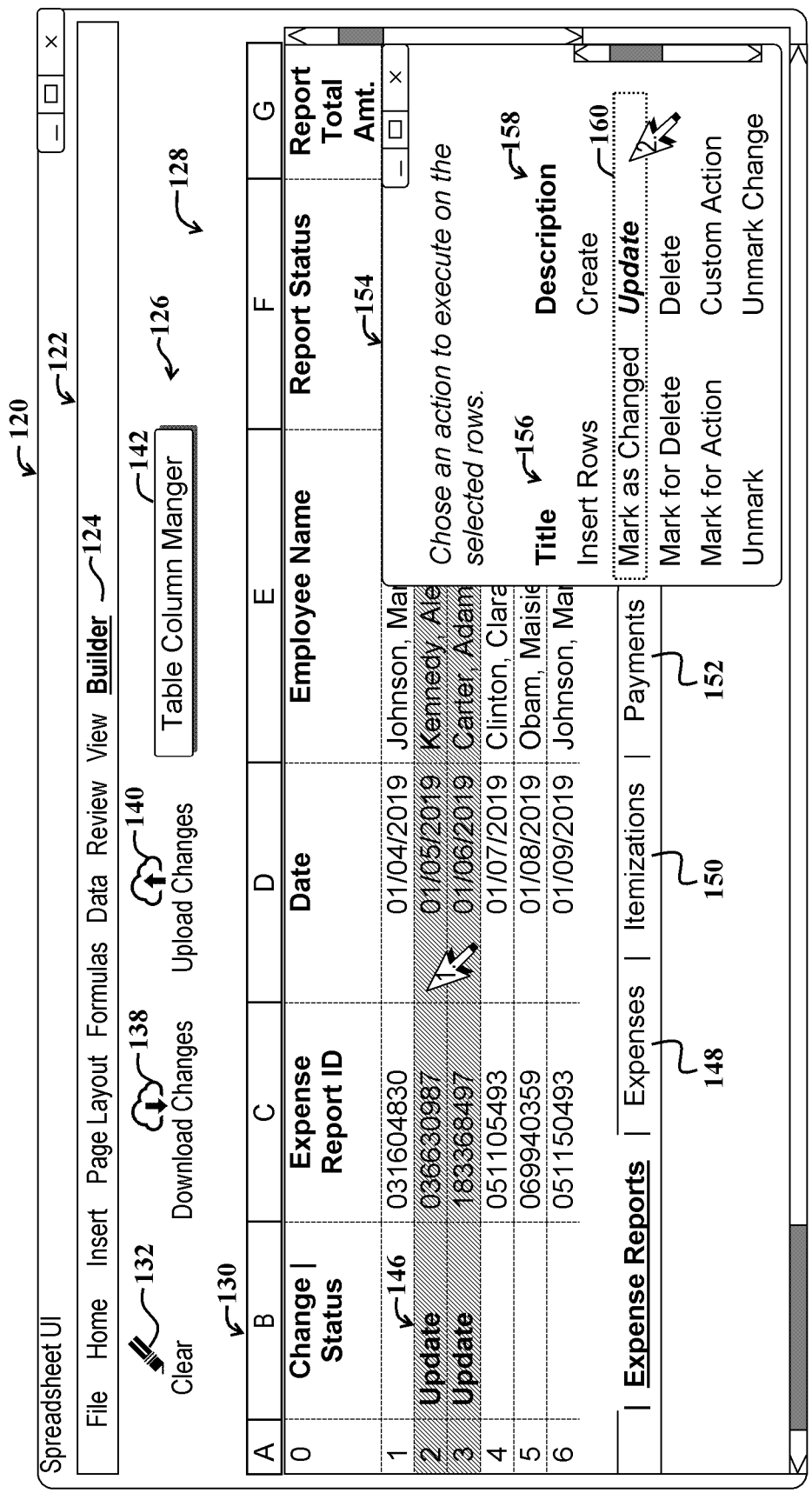
FIG. 5 illustrates a third example UI display screen representing an Expense Reports worksheet corresponding to a parent node of the example worksheet hierarchy of FIG. 1, which corresponds to a parent data object of FIG. 3, and were certain rows have been marked for an Update operation.

FIG. 5 illustrates a third example UI display screen 120 representing an Expense Reports worksheet corresponding to the parent node 30 of the example worksheet hierarchy 28 of FIG. 1, and were certain rows 146 have been marked for an Update operation.

The third example UI display screen 120 includes an example menu bar 122, where a Builder menu item 124 has been selected, thereby causing display of an example Builder ribbon with various UI controls 126, including a Clear control 132, a Download Changes control 138, an Upload Changes control 140, and a Table Column Manager button 142.

The third example UI display screen 120 further illustrates an Expense Reports worksheet 128. To access other worksheets, a user may select other tabs, e.g., an Expenses tab 148, an Itemizations tab 150, or a Payments tab 152.

Currently, in the Expense Reports worksheet 128 and associated tab, a user has selected a couple of rows 146 (e.g., rows 2,3) and then used a dialog box, e.g., a "Chose Action" dialog box 154, to mark the selected rows 146 for specific operations, e.g., in this case, "Update" operations.

Note that the "Choose Action" dialog box 154 includes a title column 156 and a corresponding description column 158. The title column 156 indicates example titles of available operations that can be assigned to user selections in the Expense Reports worksheet 128, and the description column 158 provides corresponding descriptions.

Currently, a user has selected to mark the rows 146 as changed, i.e., to implement an Update operation, as indicated by a user selection 160 from the "Chose Action" dialog box 154, and as further indicated in a Change/Status column 130. In another example use case, the user edits data in the one or more rows 146, and the add-in 18 of FIG. 1 then automatically marks the one or more rows 146 for an Update operation.

Note that the various columns (A-G) shown in in the Expense Reports tab 128 represent Expense Report data. The expense report data shown in the Expense Reports tab 128 may be marked for update, deletion, or other operation, via user interaction with the spreadsheet 16 of FIG. 1.

After marking certain rows for operations, e.g., rows 2, 3 for an Update operation, and after user selection of the Upload Changes control 140, the service-interface add-in 18 of FIGS. 1-2 will first confirm that modifications to the Expense Reports tab 128 and associated worksheet or table will be applicable to the first data object 70 of the server-side hierarchy 44 of FIG. 3, which currently maintains data pertaining to Expense Reports 78. The service-interface add-in 18 of FIGS. 1-2 will perform similar confirmations before or during implementation of operations or custom actions that have been applied to certain rows of certain specific worksheets of the structured worksheet 26 of FIG. 1.

Note that the Expense Reports tab 128 and accompanying worksheet or table may correspond to or represent the parent worksheet 30 of the client-side worksheet hierarchy 28 of FIG. 1.

Figure 6:
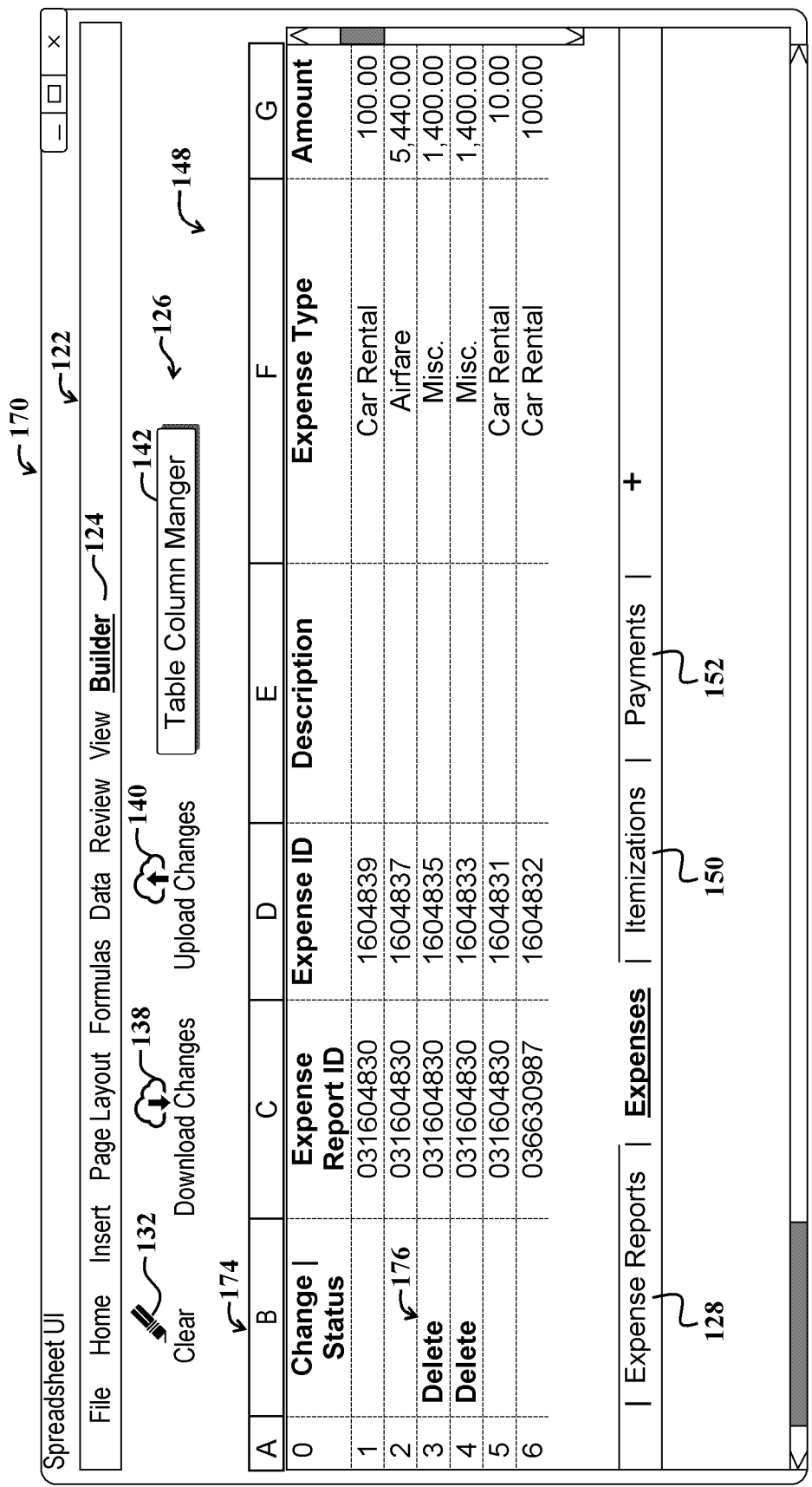
FIG. 6 illustrates a forth example UI display screen representing an Expense worksheet corresponding to a child node of the primary node (e.g., of the Expense Reports node) of the worksheet hierarchy of FIG. 1, and corresponding a child node of a parent node of the data model hierarchy of FIG. 3, and were certain rows have been marked for a Delete operation.

FIG. 6 illustrates a forth example UI display screen 170 representing an Expense worksheet (as shown in an Expenses tab 148) corresponding to a child node of the primary node (e.g., of the Expense Reports node 30) of the worksheet hierarchy 28 of FIG. 1, and were certain rows have been marked for a Delete operation.

Note that the Expenses tab 148 and accompanying worksheet (corresponding to the first child worksheet 32 of FIG. 1) includes table data that corresponds to (or may be synchronized with or is otherwise applicable to or associated with) Expenses data 80 of the first child data object 72 of the server-side hierarchy 44 of FIG. 3.

In the present example scenario, a user has marked a couple of rows 176 (rows 3, 4) for deletion. The user may have marked the rows for deletion via a "Chose Action" dialog box, such that the "Choose Action" dialog box 154 of FIG. 5.

Upon user selection of the Upload Changes button 140, the system 10 of FIG. 1 will return the results of the "Delete" operation, i.e., indicating whether or not the rows 3, 4 were successfully deleted. Such indication may be provided in a Change/Status column 174.

Furthermore, any such row deletions of the rows 176 of FIG. 6 will be coordinated with any updates of the block of rows 146 of FIG. 5 by the orchestrator 20 of FIG. 2, which may traverse the client-side hierarchy 28 of FIG. 1 and facilitate implementing any changes/updates/actions as needed in view of the structure of the hierarchical object data models 40 of FIG. 1 and corresponding client-side worksheet hierarchy 28.

Figure 7:
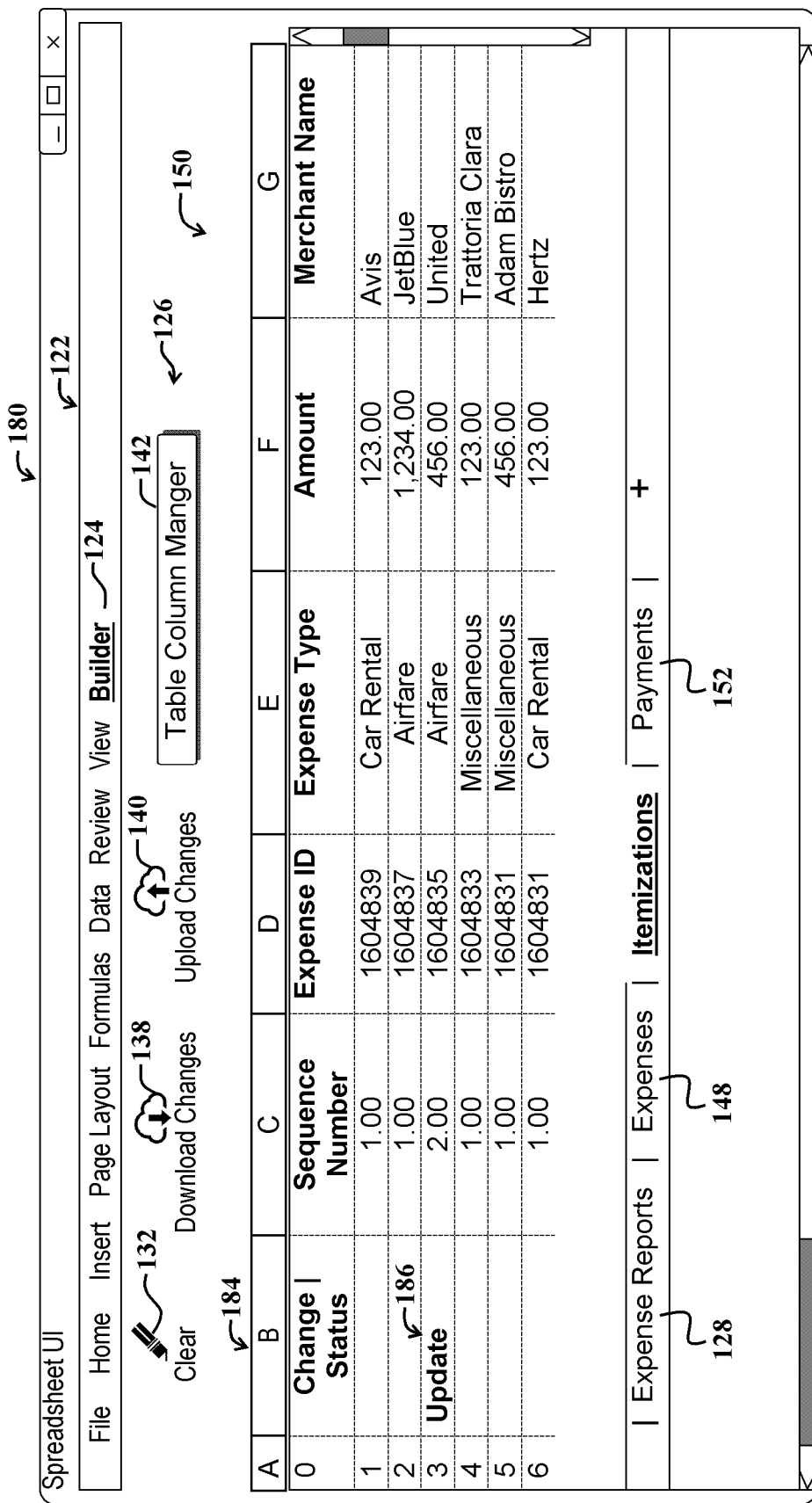
FIG. 7 illustrates a fifth example UI display screen representing an Itemization worksheet corresponding to a grandchild node of the primary node (e.g., of the Expense Reports node) of the worksheet hierarchy of FIG. 3, and representing a child worksheet of the Expense worksheet of FIG. 6, and wherein certain rows have been marked for an Update operation.

FIG. 7 illustrates a fifth example UI display screen 180 representing an Itemization worksheet (corresponding to an Itemizations tab 150) corresponding to a grandchild node 76 of the primary node (e.g., of the Expense Reports node 70) of the worksheet hierarchy 44 of FIG. 3, and representing a child worksheet of the Expense worksheet 146 of FIG. 6. A row 186 (in an updated Change/Status column 184) has been marked for an Update operation.

Note that the worksheet of the Itemizations tab 150 may further correspond to or represent the first grandchild worksheet 36 of the client-side worksheet hierarchy 28 of FIG. 1.

Figure 8:
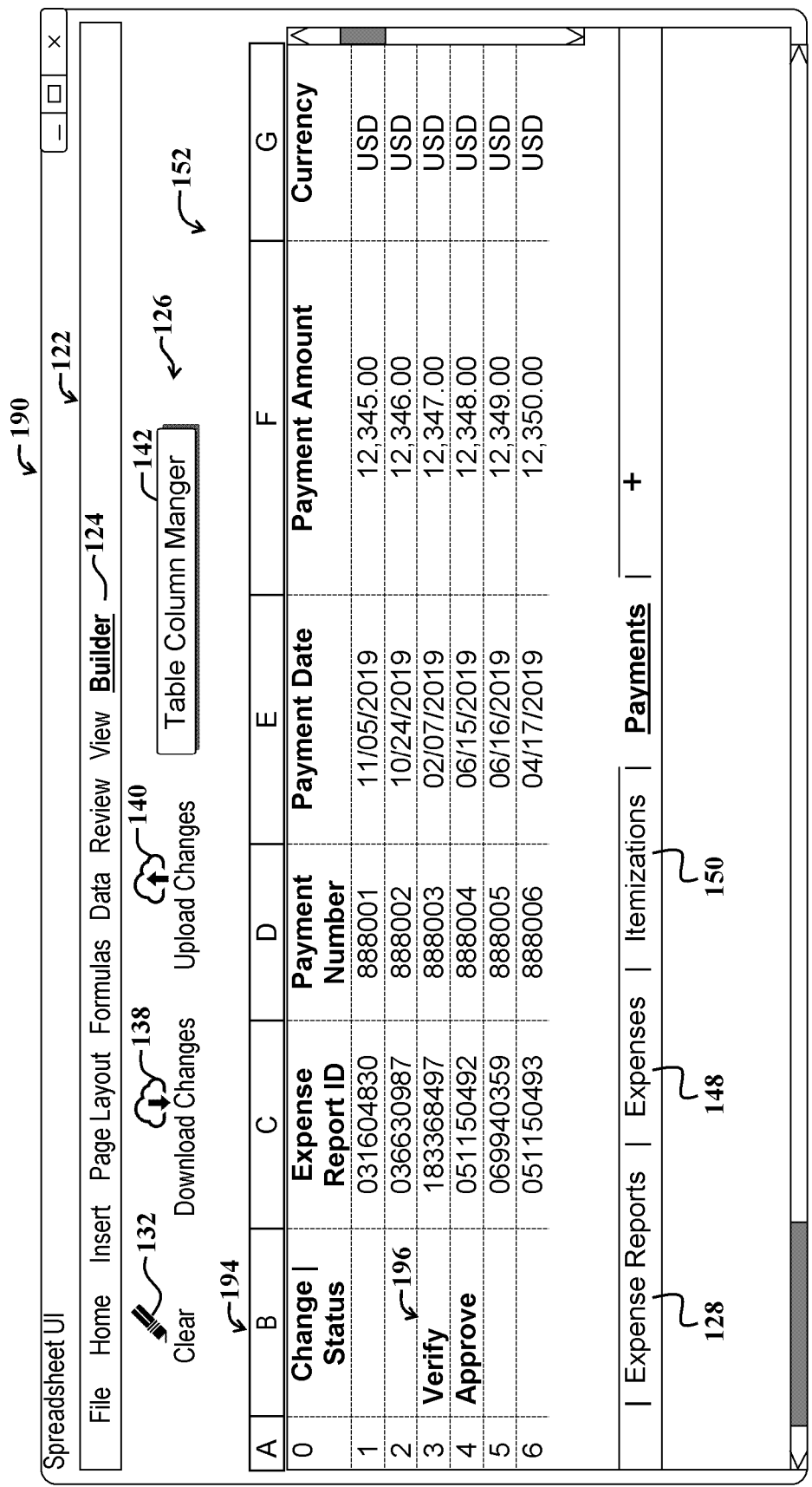
FIG. 8 illustrates a sixth example UI display screen representing a Payments worksheet corresponding to a child node of the primary node (e.g., of the Expense Reports node) of the data object hierarchy of FIG. 3, and representing a sibling worksheet of the Expense worksheet of FIG. 6, and wherein certain rows have been marked for an example Verify Payment custom action operation.

FIG. 8 illustrates a sixth example UI display screen 190 representing a Payments worksheet (corresponding to a Payments tab 152) corresponding to the second child node 74 of the primary node 70 (e.g., of the Expense Reports node 70) of the data object hierarchy of FIG. 3, and representing a sibling worksheet of the Expense worksheet of FIG. 6. A couple of rows 196 have been marked for custom actions (e.g., Verify and Approve), which may represent process-based software applications.

Note that, with reference to FIGS. 1, 3, and 8 that the worksheet represented by the Payments tab 152 of FIG. 8 may correspond to the first grandchild worksheet 36 of FIG. 1, which may also correspond to the first grandchild data object 76 of FIG. 3.

For illustrative purposes a couple of rows 196 (rows 2, 3) have been marked for custom actions, e.g., a "Verify" and an "Approve" action. Note that upon user selection of the Upload control 140, the orchestrator 20 of FIG. 2 may call the services for custom actions 54 to selectively launch any additional code, e.g., process-based software applications needed to implement the specified custom actions in the rows 196, as indicated in an updated change/status column 194.

Note that upon user selection of the Upload control 140, changes or operations scheduled across the worksheet hierarchy (e.g., the hierarchy 28 of FIG. 1) corresponding any operations scheduled for the worksheets of FIGS. 5-8, that the orchestrator 20 of FIG. 1 will traverse the associated client-side hierarch 28 and call the appropriate web services 24 to ensure that scheduled changes or operations are performed consistently relative to server-side data maintained in the hierarchical object data model 40 and the client-side data of the client-side hierarchy 28 of FIG. 1.

Figure 9:
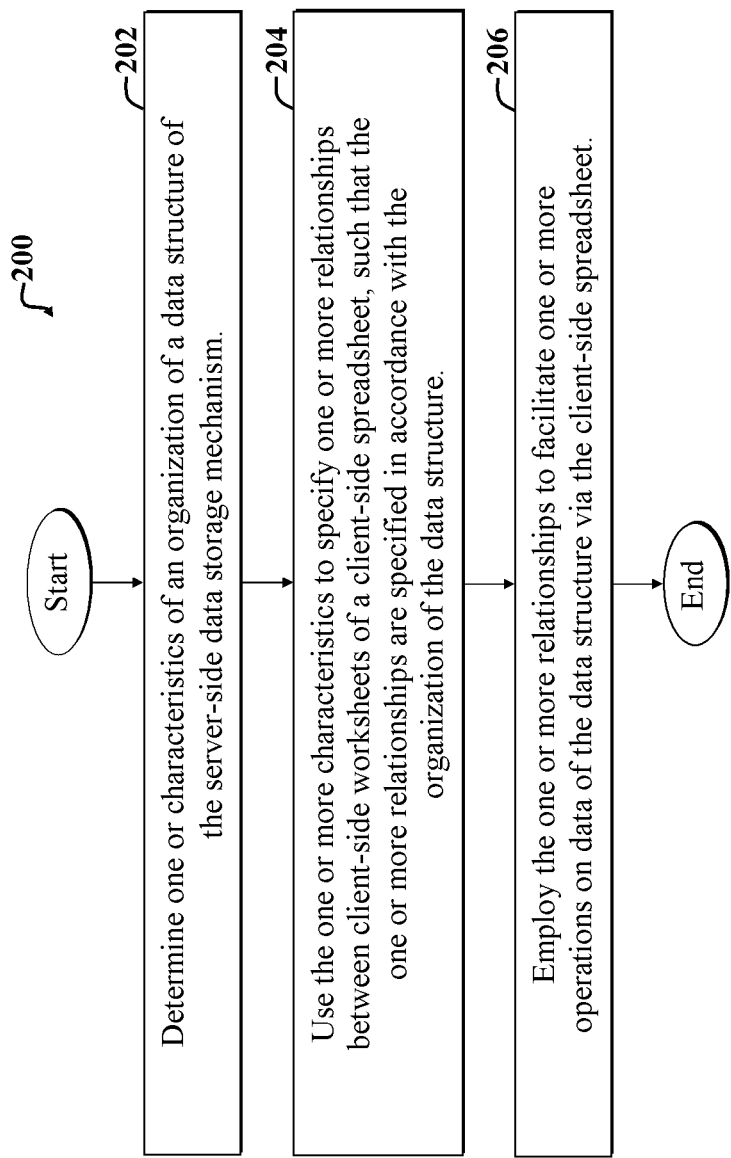
FIG. 9 is a flow diagram of a first example method suitable for use with the embodiments of FIGS. 1-8.

FIG. 9 is a flow diagram of a first example method 200 suitable for use with the embodiments of FIGS. 1-8. The first example method 200 facilitates communications between a client-side spreadsheet (e.g., the spreadsheet 16 of FIG. 1) and a server-side data storage mechanism (e.g., the backend database 46 and accompanying hierarchical object data models 40).

A first determining step 202 includes determining one or more characteristics of an organization of a data structure (e.g., the hierarchical structure of the hierarchical object data model 40 of FIGS. 1-2) of the server-side data storage mechanism.

Subsequently, a using step 204 includes using the one or more characteristics (e.g., as collected by the workbook constructor 60 of FIG. 2 using the data object analyzer 52 and business object catalog 48) to specify one or more relationships (e.g., child-parent relationships) between client-side worksheets of a client-side spreadsheet, such that the one or more relationships are specified in accordance with the organization of the data structure.

Next, an employing step 206 includes employing the one or more relationships (e.g., hierarchical relationships) to facilitate one or more operations (e.g., CRUD operations and/or custom actions) on data of the data structure (e.g., corresponding to the hierarchical object data model 40 of FIGS. 1-2 and the accompanying hierarchy 44 of FIGS. 1-3) via the client-side spreadsheet (e.g., the spreadsheet 16 of FIG. 1).

Note that the first example method 200 may be altered, without departing from the scope of the present teachings. For example, the employing step 206 may further include a step of facilitating the one or more operations on data of the data structure responsive to user input provided via one or more UI controls, such as an Upload or Download control.

The step of employing 206 may further include using the one or more relationships to selectively synchronize data in the spreadsheet (e.g., data of the worksheets 30-36 and associated hierarchy 28 of FIG. 1) with data of the data structure (e.g., corresponding to data of the server-side hierarchy 44 of FIGS. 1-3 and associated hierarchical object data model 40 of FIGS. 1-2).

The first example method 200 may further specify that the organization of the data structure includes a hierarchy of data objects; wherein the hierarchy of data objects includes a tree structure; and wherein the one or more relationships between the client-side worksheets are described, at least in part, by the tree structure or a portion thereof.

The one or more relationships may match one or more associations between one or more data objects of the data structure, such that the one or more client-side worksheets are related as a hierarchy of worksheets, and wherein the hierarchy of worksheets (e.g., corresponding to the hierarchy 28 of FIG. 1) is based on the hierarchy of data objects (e.g., corresponding to the server-side hierarchy 44 of FIGS. 1-3).

The step of employing 206 may further includes traversing the hierarchy of worksheets (e.g., the hierarchy 28 of FIG. 1) to selectively implement one or more actions specified in one or more of the worksheets to thereby perform actions specified in the one or more worksheets on corresponding data objects of the hierarchy (e.g., the server-side hierarchy 44 of FIGS. 1-3) of data objects.

Figure 10:
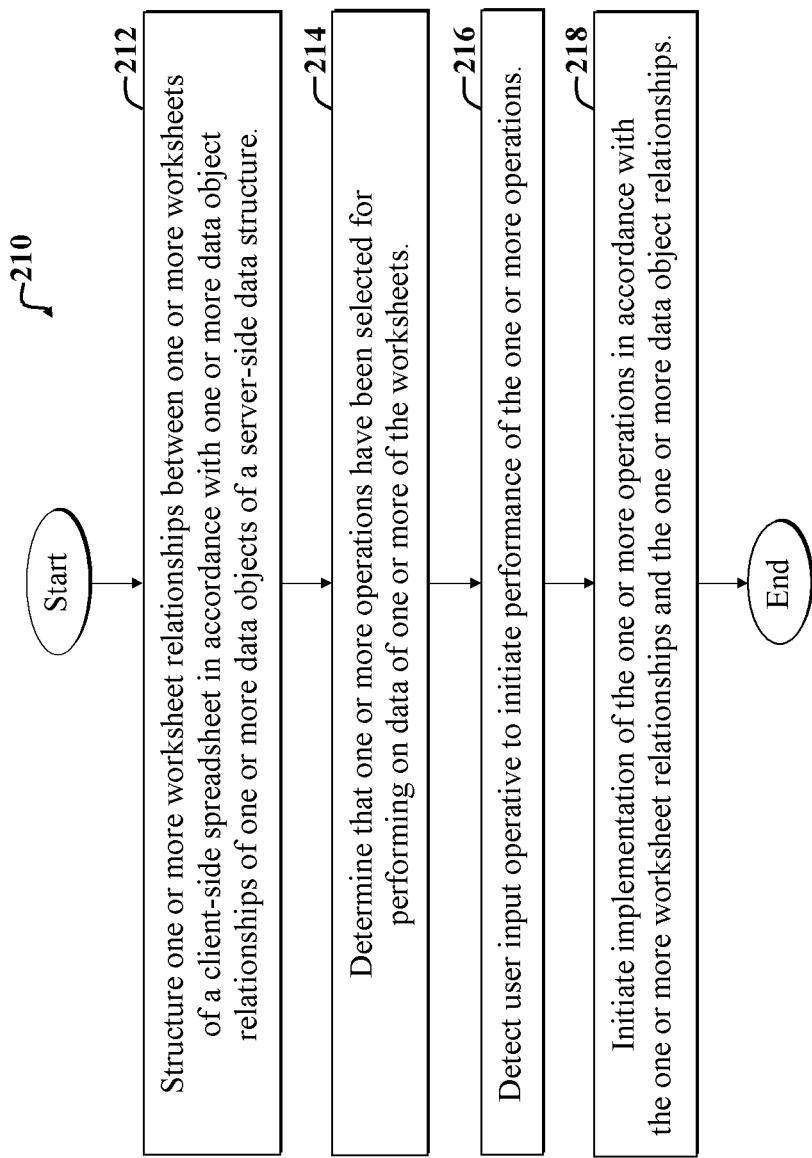
FIG. 10 is a flow diagram of a second example method suitable for use with the embodiments of FIGS. 1-9.

FIG. 10 is a flow diagram of a second example method 210 suitable for use with the embodiments of FIGS. 1-9. The second example method 210 facilitates orchestrating changes of data made in a client-side program (e.g., the spreadsheet 16 of FIG. 1) with changes of corresponding data made in one or more server-side data objects (e.g., data objects of the hierarchically related business objects 42 of FIG. 1)

A first step 212 includes structuring one or more worksheet relationships (e.g., hierarchical relationships) between one or more worksheets of a client-side spreadsheet in accordance with one or more data object relationships of one or more data objects of a server-side data structure.

A second step 214 includes determining that one or more operations have been selected for performing on data of one or more of the worksheets.

A third step 216 includes detecting user input (e.g., selection of an Upload control 138 of FIGS. 5-8) operative to initiate performance of the one or more operations (e.g., CRUD operations or custom actions).

A fourth step 218 includes initiating implementation of the one or more operations in accordance with the one or more worksheet relationships and the one or more data object relationships.

Note that the method 210 may be altered, without departing from the scope of the present teachings. For example, the second example method 210 may further specify that the server-side data structure includes one or more hierarchical relationships (e.g., as illustrated in FIG. 3) representing the one or more relationships of the one or more data objects. The server-side data structure may include a tree structure. The one or more data objects may include one or more business objects.

The fourth step 218 may further include employing an add-in to the spreadsheet to generate and issue one or more request messages to one or more web services tasked with completing the one or more operations based on the one or more data object relationships.

Generally embodiments enable users to take advantage of (i.e., leverage) functionality provided by web services, and to call those web services from a spreadsheet, while also leveraging existing functionality provided by the spreadsheet. In addition to standard CRUD operations, various embodiments may allow various rows to be marked (including marked in bulk) for other software actions, e.g., custom actions, to be invoked (including invoked in bulk) upon submittal of the corresponding fields to the corresponding web services or APIs.

Figure 11:
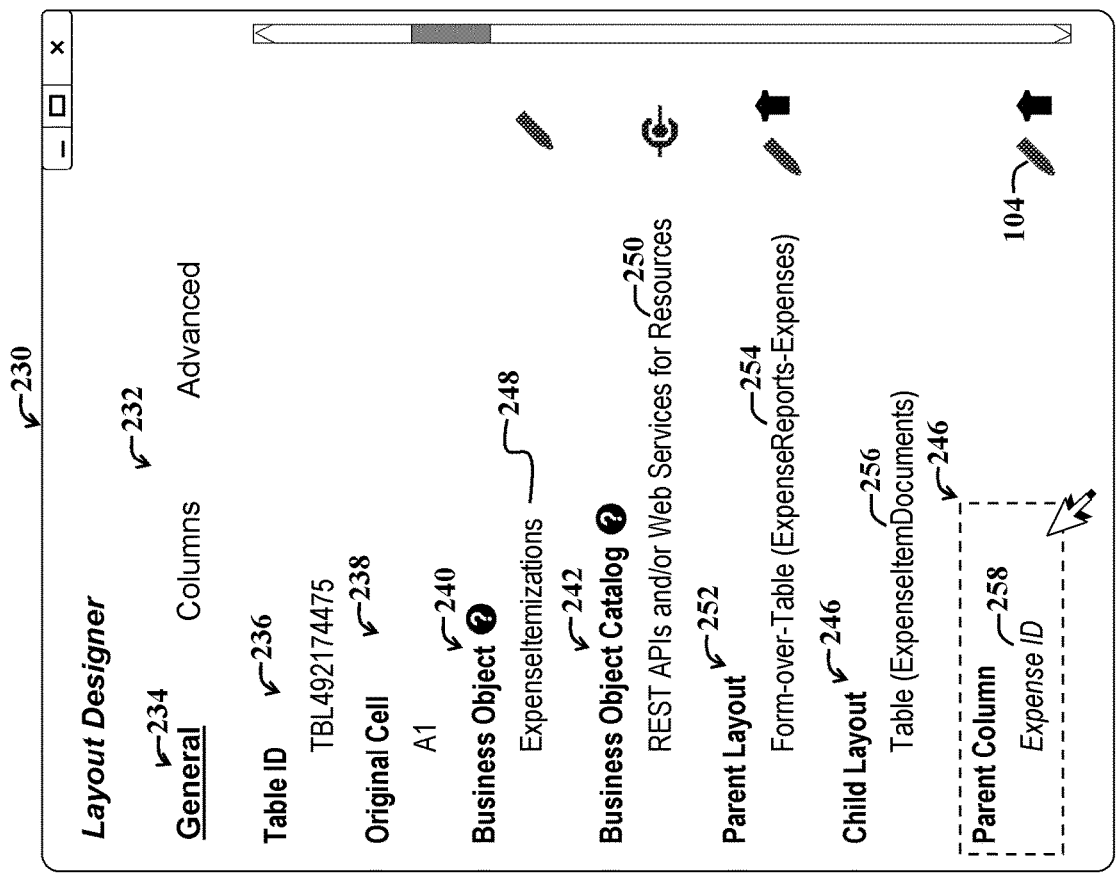
FIG. 11 illustrates a seventh example UI display screen, which includes additional example user options beyond those shown in the related UI display screen of FIG. 4A for specifying hierarchical relationships between worksheets of a workbook, including a UI control for selecting a column of a parent worksheet from which the current worksheet will depend, i.e., represent a child thereof.

FIG. 11 illustrates a seventh example UI display screen 230, which includes additional example user options 236-258 beyond those shown in the related UI display screen 90 of FIG. 4A for specifying hierarchical relationships between worksheets of a workbook (e.g., Expense Reports, Expenses, Itemization, Payments, etc.), including a UI control (e.g., pencil button 104) for selecting a column or row of a parent worksheet from which the current worksheet will depend, i.e., represent a child thereof.

The seventh example UI display screen 230 includes various tabs 232, including a currently selected General tab 234. The General tab 234 includes various sections, including a Table ID section 236, showing an identification of the current table associated with the current worksheet; an Original Cell section 238, illustrating a cell that has been selected before activating the seventh example UI display screen 230 (also called a Layout Designer screen); a Business Object section 240, identifying a business object 248 that is associated with the current worksheet; a Business Object Catalog section 242, identifying the current business object catalog 250 associated with the current worksheet; a Parent Layout section 252 identifying the type and name 250 of the parent layout currently assigned to the current worksheet; a Child Layout section 246 identifying a child worksheet 254 of the current worksheet, and a Parent Column section 246, identifying a column of a parent worksheet of the current worksheet that is associated with the cell indicated in the Original Cell section 238.

In the present example embodiment, the Parent Column section 246 indicates that the currently selected parent column for a particular selected row and/or cell (e.g., cell A1, as indicated in the Original Cell section 238) of the current worksheet is Expense ID 258. Note that an additional UI control 104, e.g., represented by a pencil button or icon, may be selected to activate another menu for enabling users to identify or otherwise specify particular columns and/or rows of a parent worksheet to associate with particular rows and/or columns of the current, i.e., child of the parent, worksheet. An example of a menu that may be displayed in response to user selection of the additional UI control 104 (also called edit button or pencil icon or control) is discussed more fully with reference to FIG. 12.

Note that in a use case where a user decides to create new rows in a worksheet that is associated with a particular sever-side business object, certain embodiments discussed herein facilitate enabling users to assign particular rows, which have been marked for a Create operation, to certain columns and/or rows of a parent worksheet, as discussed more fully below. Note that while a user may select particular parent columns and/or rows for association with particular columns and/or rows of a given worksheet, embodiments are not limited thereto. For instance, in certain implementations, the add-in 18 of FIGS. 1-2 may automatically assign one or more parent columns and/or rows to a given selected row of a child worksheet that has been marked for a Create operation. This may be done by inference, based on other data in a given row in view of data in the parent worksheet.

Generally, in a given worksheet, when creating new business object items (e.g., table rows) that are hierarchically related (e.g., where a given table shows all child rows for all parent rows, e.g., all Itemizations for all Expenses), the user and/or system should know which parent row (of a parent worksheet) to use as the parent for a given child row (of a child worksheet). For instance, when creating new Itemizations (e.g., rows of the Itemization worksheet 150 of FIG. 7), a user should know how to specify, visualize, and/or keep track of parent Expenses (e.g., corresponding to the tab 148 of FIG. 7 and the associated table of FIG. 6); especially when creating new Itemizations in bulk. Embodiments discussed herein facilitate this, as discussed more fully below.

In the present example embodiment, the add-in 18 of FIGS. 1-2 facilitates this, in part, by allowing the end user to select from a list of parent rows (e.g., individual expenses indicated in an Expenses worksheet), as discussed more fully below with reference to FIG. 12. A display of the list may be activated by selecting the pencil icon 104.

Then, upon the next upload operation, the new Itemization will be created properly as a child of the chosen Expense (e.g., corresponding to one or more rows or columns of the parent worksheet). To help the user keep track of which Itemization belongs to which Expense, one or more new columns can be added to the Itemization table (e.g., as discussed more fully below with reference to FIGS. 13-14) and, upon a Download operation, populated with an identification (ID) value from the parent table, i.e., worksheet (e.g., the Expenses table of FIGS. 5-8).

In the present example embodiment, during design time, for the Itemizations worksheet (also called Itemizations table herein), the General tab 234 of the layout designer 230 will be updated (upon user selection of one or more parent columns or rows) to show a Parent Column property (e.g., the property 258), e.g., in the Parent Column section 246 of FIG. 11. Clicking the pencil or edit button 104 results in display of another UI display screen (e.g., a UI display screen 270 of FIG. 12), enabling a workbook developer to choose one or more columns or rows from the parent table or worksheet (e.g., Expenses) to show in the child worksheet (e.g., Itemizations table).

FIG. 12 illustrates an eighth example UI display screen 270, which may be displayed after user selection of the edit UI control (e.g., pencil icon) 104 in the seventh example UI display screen 230 of FIG. 11, and which provides user options 272 to select one or more columns from a parent worksheet (e.g., Expenses worksheet or table) to show in the current child worksheet (e.g., Itemizations worksheet).

In the present example embodiment, a user has selected an Expense ID business object 274 (also called the user selection) corresponding to a column or row of the parent (e.g., Expenses) worksheet. Once chosen, the child worksheet (e.g., Itemizations table) will have a new column, e.g., labeled "Expense ID* (Expenses)," as shown in FIG. 13.

Figure 13:
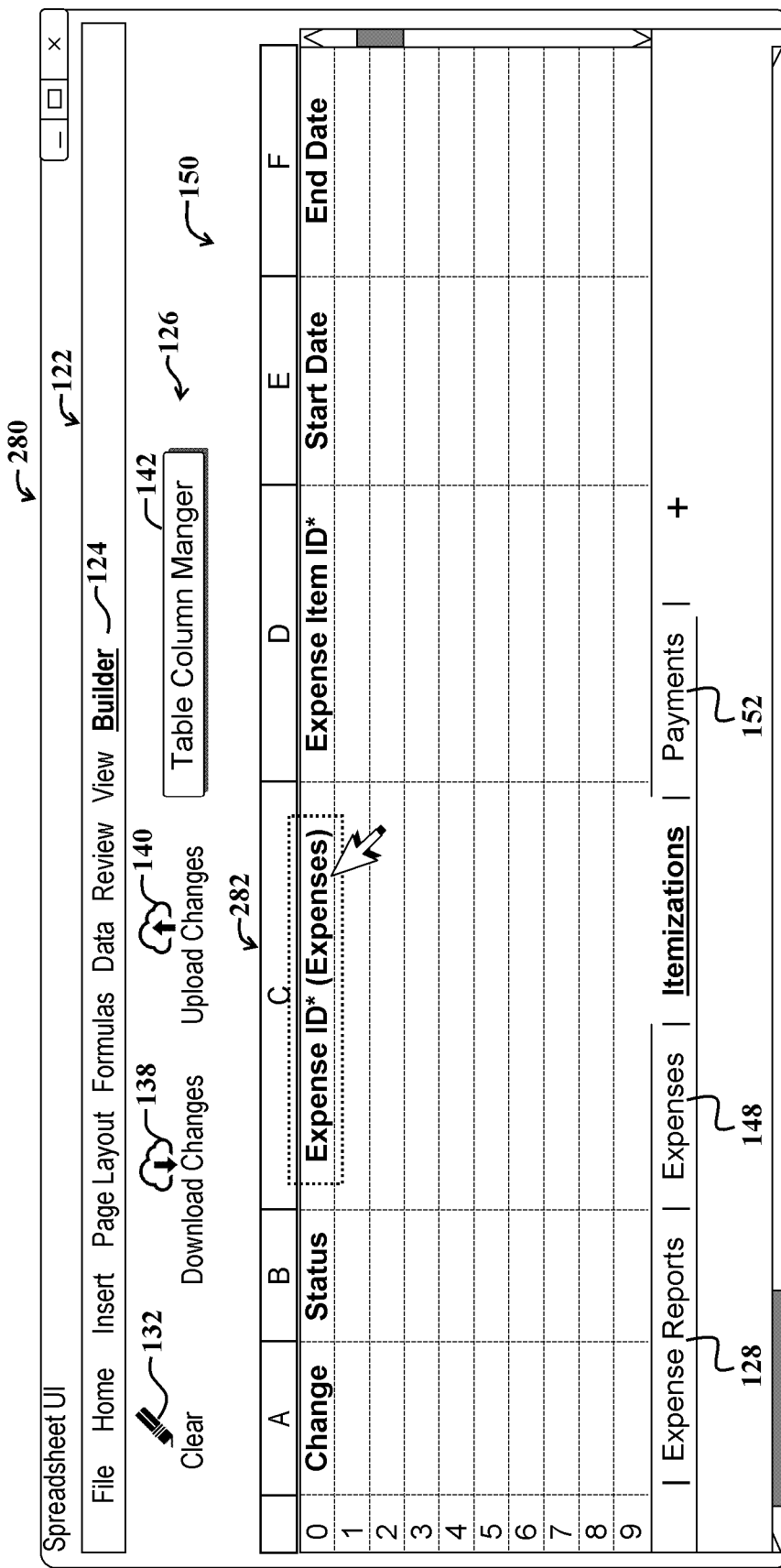
FIG. 13 illustrates a ninth example UI display screen showing an example worksheet resulting in a new column pertaining to the selected parent column via the UI display screens of FIGS. 11-12.

FIG. 13 illustrates a ninth example UI display screen 280 showing an example worksheet 150 (e.g., Itemizations worksheet) resulting in a new column 282 (also called the Expense ID column) pertaining to a selected parent column or row (e.g., corresponding to the selection 274 of FIG. 12) via the UI display screens of FIGS. 11-12.

Note that, at runtime, on download, the parent column or row (of the child worksheet) will be populated with values from the accompanying worksheet/table (i.e., parent table, e.g., Expenses worksheet), and the associated cells of the selected column of the child worksheet may be read-only. This may help the user to keep track of which parent Expense is associated with each Itemization (remembering that the Itemizations worksheet and accompanying table may have all rows for all parents, e.g., expenses of the parent Expenses worksheet).

FIG. 14 illustrates a tenth example UI display screen 290 the example worksheet 150 of FIG. 13 after user selection of the Download control 138 (also called the Download Changes control) from the ninth example UI display screen 280 of FIG. 13.

Note that the worksheet 150 of FIG. 14 now (after download) includes data, e.g., in columns C-F that has been downloaded via the server system, e.g., the server system 14 of FIGS. 1-2. Also, note that an Expense ID column 282 (column C), which was added via the UI display screens of FIGS. 11-12 as a parent of the itemizations worksheet 150, is also populated with Expense IDs.

Figure 15:
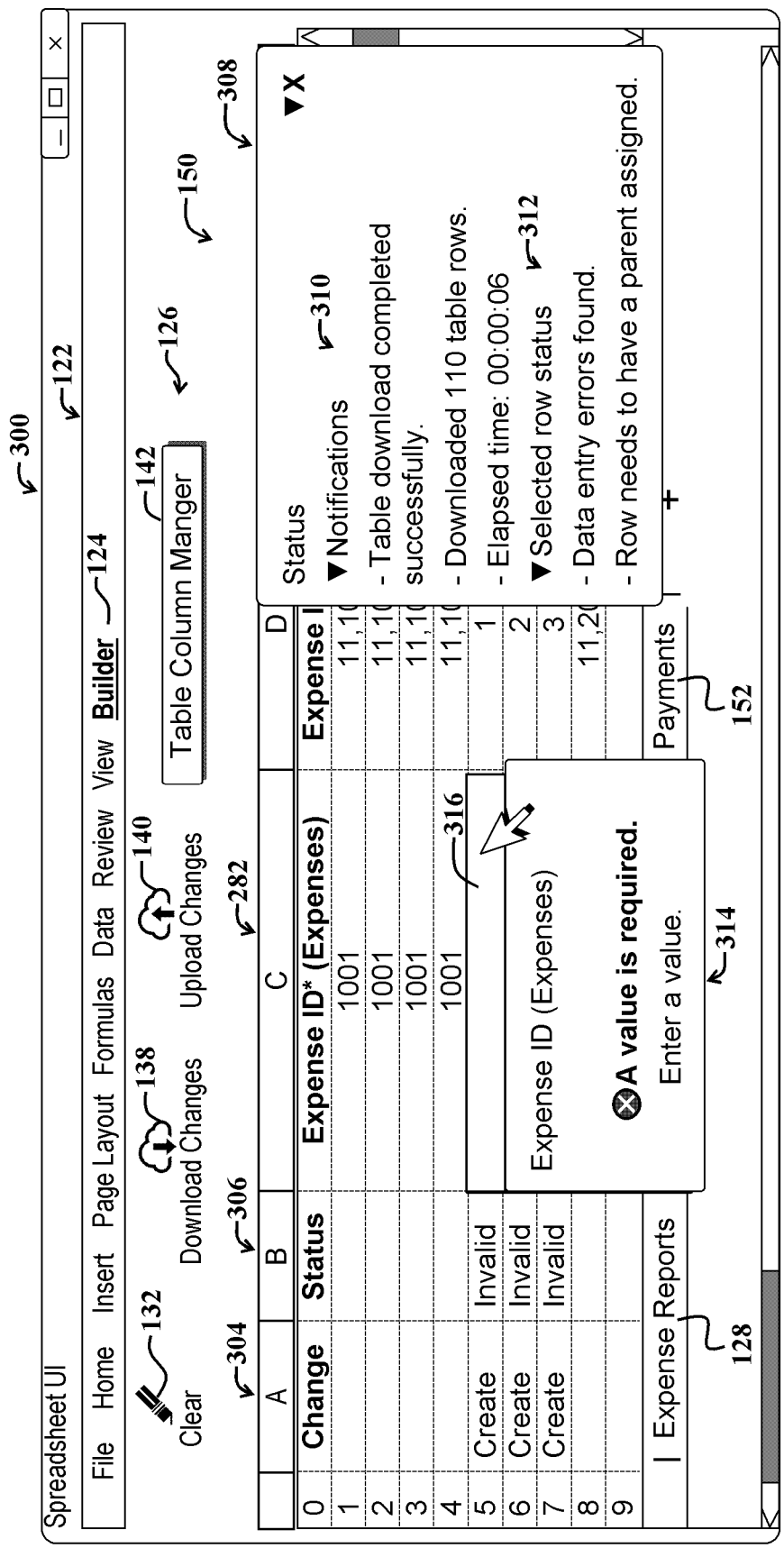
FIG. 15 illustrates an eleventh example UI display screen illustrating, via an indicator box 314, that an Expense ID representing a parent row or column of a parent Expense worksheet of the current child Itemizations worksheet 150 must be specified to facilitate a Create operation on rows marked for the Create operation.

FIG. 15 illustrates an eleventh example UI display screen 300 illustrating, via an indicator box 314, that an Expense ID representing a parent row or column of a parent Expense worksheet of the current child Itemizations worksheet 150 must be specified to facilitate a Create operation on rows marked for the Create operation.

In the present example embodiments, rows 5-7 of the Itemizations worksheet 150 have been marked for a Create operation, e.g., as indicated by corresponding entries in a Change column 304. Note that new rows that are added or inserted into a worksheet, e.g., the Itemizations worksheet 150, may be automatically marked for a Create operation by the add-in 18 of FIGS. 1-2. Alternatively, or in addition, rows may be marked for specific operations by a user, e.g., via one or more UI controls of a given UI display screen.

An Expense ID field 316 has been highlighted in association with the indicator box 314 that indicates that an Expense ID should be entered in the indicated Expense ID field 316, so as to facilitate the slated Create operation. When the user enters an Expense ID value for the rows 5-7 that are marked for a Create operation, a corresponding Status column 306 will be updated to remove an associated Invalid status.

Note that by entering an Expense ID in the example Expense ID field 316, the user is associating the corresponding row (e.g., row 5) of the child Itemizations worksheet 150 with a corresponding parent worksheet item (e.g., Expense ID column or row).

Accordingly, for rows, e.g., rows 5-7, that are pending a Create operation (e.g., rows for new Itemizations), the user may assign one or more parent Expense items to the rows by directly entering values into the corresponding fields of the Expense ID column 282 (that is associated with the parent Expenses worksheet 128, which is a parent of the child Itemizations worksheet 150). Accordingly, the user may enter or otherwise specify the Expense items by manually typing in the fields (e.g., the Expense ID field 316) or by using a Picker UI display screen, as discussed more fully below with reference to FIG. 17.

Note that, in the present example embodiment, a row will not be created during the next Upload operation without a parent (e.g., Expense identified by the associated Expense ID) item assigned to it. The indicator box 316 acts as a popup showing that a value is required.

An accompanying Status pane 308 also shows notifications 310 and additional row-status information 312, indicating that a value is required for the Expense ID field 316, i.e., that a parent (e.g., Expense) must be assigned to the row (e.g., row 5 for a given Itemization for the Expense).

Note that to support bulk operations, a given spreadsheet may already include functionality for copying and pasting, copying via drag-down, and other mechanisms. A user may also individually directly enter parent column information (e.g., Expense ID values).

Figure 16:
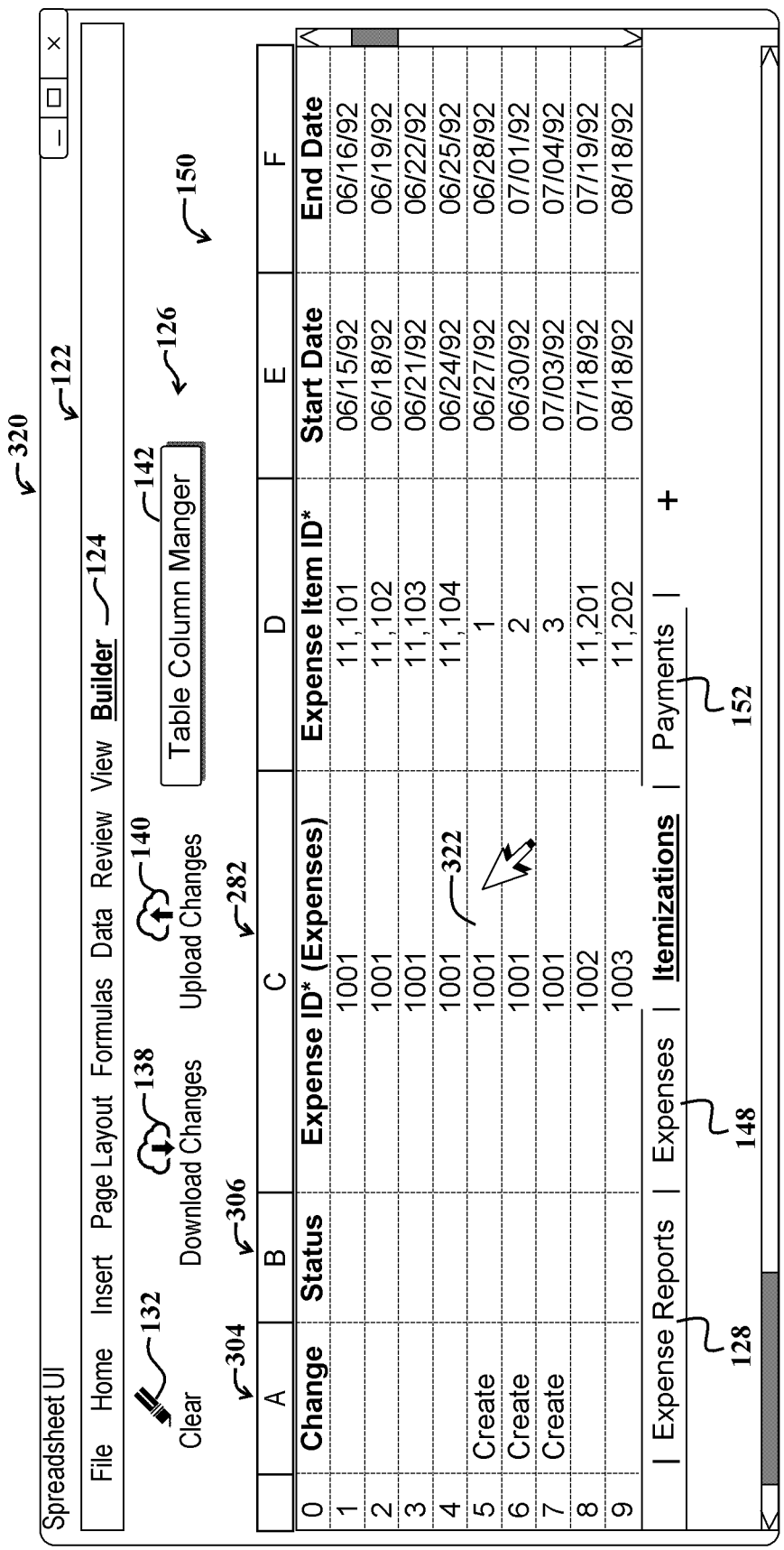
FIG. 16 illustrates an twelfth example UI display screen, where multiple rows of the child worksheet of FIG. 15 have been associated with a particular Expense ID, e.g., via a bulk operation, such as copying and pasting multiple parent column values into corresponding fields of the Expense ID column of the child worksheet (e.g., Itemization worksheet).

FIG. 16 illustrates an twelfth example UI display screen 320, where multiple rows (i.e., rows 5-7) of the child worksheet 150 of FIG. 15 have been associated with a particular Expense ID (100), e.g., via a bulk operation, such as copying and pasting multiple parent column values (1001) into corresponding fields (C5-C7), including the Expense ID field 316 of FIG. 15, of the Expense ID column 282 of the child worksheet (e.g., Itemization worksheet) 150.

Once Expense ID values are entered in the Expense ID column 282 for the rows 5-7 marked for a Create operation, and client-side validation (e.g., via the add-in 18 of FIGS. 1-2) succeeds, the indicator box 314 and associated Status pane 308 are removed from the eleventh UI display screen 300 of FIG. 15, and the rows may be ready for an Upload operation (e.g., to create the corresponding rows 5-7, i.e., to update server-side business objects 42 with the data for the rows 5-7) when desired. To initiate the Upload operation, the user may select the Upload control 140.

FIG. 17 illustrates a thirteenth example UI display screen 330 (also called a picker UI) showing user options, provided in a list 332, to pick and assign a parent column to a row (or many selected rows, e.g., rows 5-7 of FIG. 15) that are pending a Create operation. The list 334 may represent a list of columns and values from the parent worksheet or table (e.g., Expenses).

In the present example embodiment, a user has selected an initial Expense ID row 334 (Expense ID 1001), as shown in the Expense ID column 282 of FIG. 16. The example picker UI 330 may be activated via one more items accessible via one or more menus of the menu bar 122 of FIG. 15, and/or via another mechanism, such as a button, right-click menu, double-clicking one or more cells, etc. Note that the picker UI 330 may also enable assigning a given parent column or row (e.g., indicated in the list 332) to multiple child rows (e.g., rows of the Itemizations worksheet 150 of FIG. 15) that have been selected before triggering display of the picker UI 330.

Figure 18:
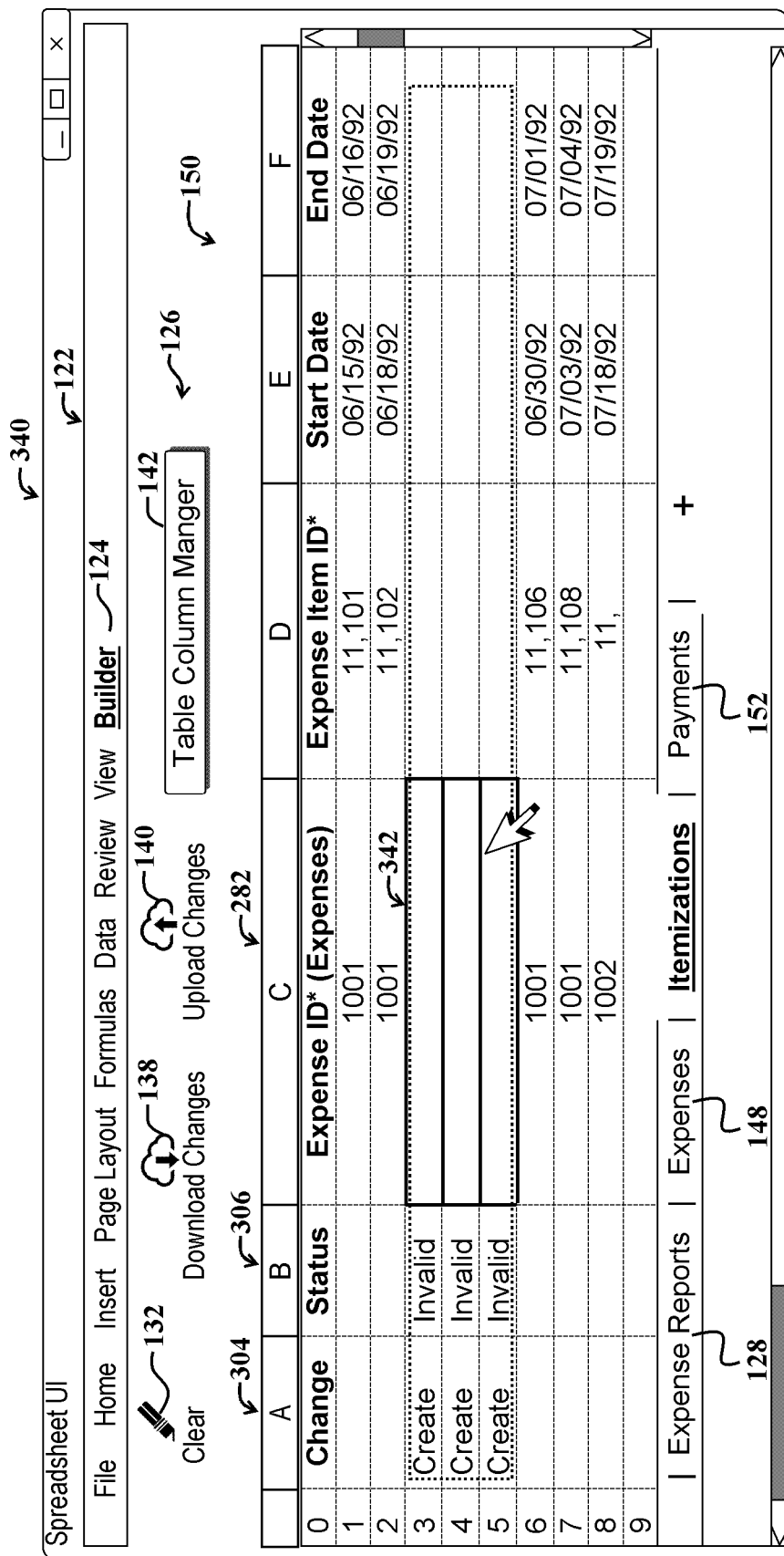
FIG. 18 illustrates an fourteenth example UI display screen before a user has employed the thirteenth example UI display screen of FIG. 17 to assign parent rows for rows to be created in a child worksheet (e.g., Itemizations worksheet).

FIG. 18 illustrates an fourteenth example UI display screen 340 before a user has employed the thirteenth example UI display screen 330 of FIG. 17 to assign parent rows for rows to be created in a child worksheet (e.g., Itemizations worksheet 150 of FIG. 15). An example selected section of rows 342 may be populated, in bulk, via use of the picker UI of FIG. 17.

Accordingly, when a user chooses a row (e.g., the first Expense ID row 334 of FIG. 17), then that parent (e.g., Expense identified by the selected row 334) is assigned to the child row or rows (e.g., the rows 3-5 of the selected block 342 of FIG. 18, representing Itemizations in the Itemization worksheet 150 of FIG. 18). The selected value (e.g., 1001) for the Expense ID is then shown in the Itemizations worksheet 150 in the parent column cells, i.e., cells of the Expense ID column 282, for the rows 3-5 of the selected block of rows 342.

Figure 19:
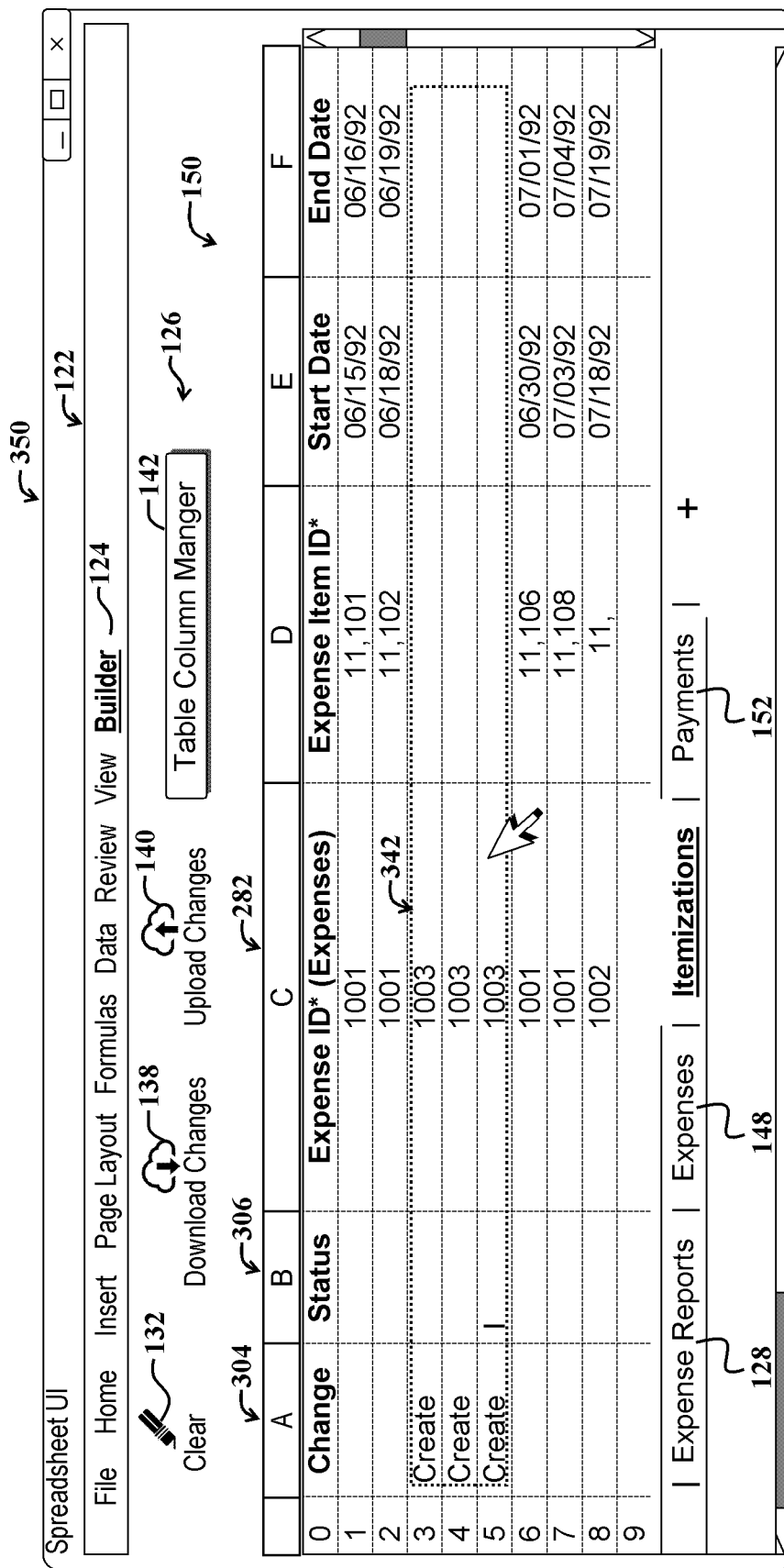
FIG. 19 illustrates a fifteenth example UI display screen for assigning parents (e.g., Expenses) to child Itemization rows pending the Create operation.

FIG. 19 illustrates a fifteenth example UI display screen 350 for assigning parents (e.g., Expenses identified by Expense ID entries in the Expense ID column 282) to child Itemization rows pending the Create operation, i.e., rows of the selected block 342.

In the present example embodiment, the user has selected Expense ID 1003, corresponding to a third row of the list 332 of FIG. 17. The three rows 3-5 of the selected block 342 are then assigned the Expense ID 1003, thereby indicating that the selected rows of block 342 have been assigned a parent column or row (of the parent Expenses worksheet) identified by the Expense ID 1003. The selected rows 342, pending the Create operation, may then be ready for further editing (as desired) and a subsequent Upload operation.

FIG. 20 illustrates a sixteenth example UI display screen 360 showing an example form-over-table worksheet 368, which may be used with embodiments discussed herein. Note that other embodiments primarily show table worksheets, but form-over-table and other types of worksheets may also be used with embodiments discussed herein.

The example form-over-table worksheet 368 includes a form 370 indicating a particular expense report and associated metadata. Expenses data for the Expense Report indicated in the form 370 are shown below the form 370 in an associated expenses table 372.

Figure 21:
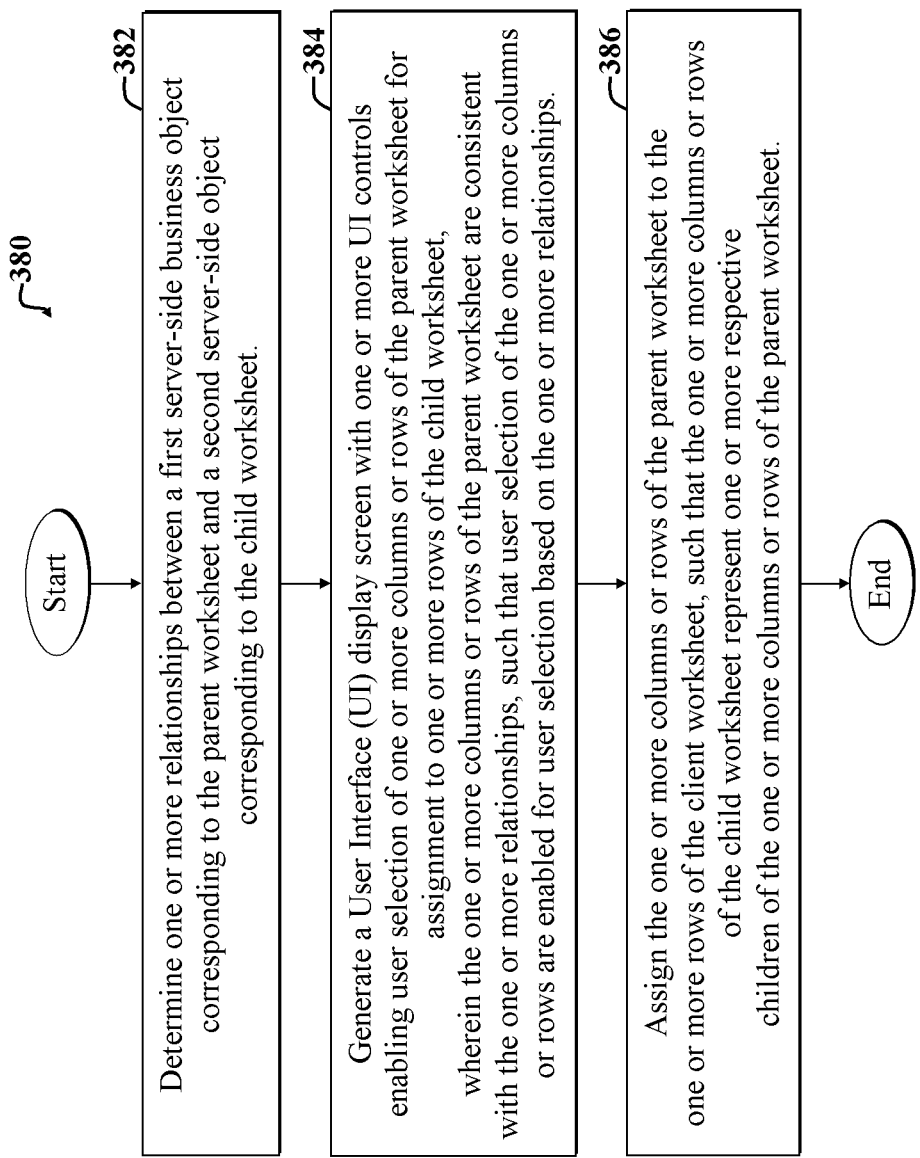
FIG. 21 is a flow diagram of a third example method suitable for use with the embodiments of FIGS. 1-22.

FIG. 21 is a flow diagram of a third example method 380 suitable for use with the embodiments of FIGS. 1-22. The third example method 380 facilitates associating one or more rows of a child worksheet (e.g., an Itemizations worksheet 150 of FIG. 7) with one or more columns or rows of a parent worksheet (e.g., Expenses worksheet 148 of FIG. 6) of a client-side spreadsheet program, e.g., the spreadsheet program 16 of FIG. 1.

The third example method 380 includes an initial determining step 382, which includes determining one or more relationships (e.g., hierarchical relationships, such as parent, child, sibling, etc.) between a first server-side business object (e.g., the object (2a) 72 of FIG. 3) corresponding to the parent worksheet (e.g., the Expenses worksheet 148 of FIG. 6) and a second server-side object (e.g., the object (3a) 76 of FIG. 3) corresponding to the child worksheet (e.g., the Itemizations worksheet 150 of FIG. 7).

Next, a UI generating step 384 includes generating UI display screen (e.g., corresponding to the thirteenth UI display screen 330 of FIG. 17) with one or more UI controls (e.g., corresponding to the selectable rows of the list 332 of FIG. 17) enabling user selection of one or more columns or rows of the parent worksheet (e.g., as indicated in rows of the user selectable list 332 of FIG. 17) for assignment to one or more rows of the child worksheet. The one or more columns or rows of the parent worksheet are consistent with the one or more relationships (e.g., between data objects), such that user selection of the one or more columns or rows are enabled for user selection based on the one or more relationships.

An assigning step 386 includes assigning the one or more columns or rows of the parent worksheet to the one or more rows of the child worksheet, such that the one or more rows of the child worksheet represent one or more respective children of the one or more columns or rows of the parent worksheet.

Note that the third example method 380 may be modified, without departing from the scope of the present teachings. For example, the method 380 may further specify enabling bulk operations for multiple rows that are pending a Create operation and/or other operation.

Note that the third example method 380 and associated UI display screens 11-19 address a use case where, when creating new business object items (e.g., corresponding to worksheets and/or rows thereof), in a hierarchical arrangement (where a given table shows all child rows for all parent rows—e.g., all Itemizations for all Expenses), and the add-in (e.g., the add-in 18 of FIGS. 1-2) and user should know which parent row (of a parent worksheet) to use as the parent when creating a new child (e.g., child row of a child worksheet). That is, when creating new Itemizations, the end user would like to specify, visualize, and keep track of the parent Expenses, especially when creating new Itemizations in bulk.

The present example embodiment employs the add-in 18 of FIGS. 1-2 and facilitates this, in part, by: allowing the end user to select from a list of one or more parent columns or rows (e.g., Expenses) (e.g., corresponding to the list 332 of FIG. 17) to assign the one or more parent columns or rows to the Itemization (e.g., corresponding to one or more rows 3-5 of the selected block 342 of FIG. 19) that is pending a Create operation; then, on the next Upload operation, the new Itemization is created properly as a child of the chosen Expense (e.g., chosen from the list 332 of FIG. 17).

To help the user keep track of which Itemization belongs to which Expense, one or more new columns (e.g., corresponding to the Expense ID column 282 of FIG. 19) can be added to the Itemizations table (e.g., corresponding to the Itemizations worksheet 150 of FIG. 19) and populated with a value (e.g., Expense ID) from the parent worksheet (e.g., Expenses worksheet).

Accordingly, creating new rows in a business object hierarchy involves assigning one or more parent columns or rows for each new row to be created in the associated child worksheet. The ability to configure a special parent column (e.g., the Expense ID column 282 of FIG. 19) in a worksheet/table at lower levels in the hierarchy may facilitate this assignment and allow the end user to track, filter, and analyze rows pending Create operations for a hierarchical business object. This can be particularly important when the orchestrated hierarchy retrieves and manipulates all child items for all parent items into a single child table.

In summary, with reference to FIGS. 1-21, various embodiments discussed herein facilitate orchestration of CRUD operations for a hierarchical web service data model in a spreadsheet, e.g., the client-side spreadsheet 18 of FIGS. 1-2.

Generally, embodiments add the capabilities of coordinated Download, Upload, and Clear operations across a set of spreadsheets that each manage a part of a business object hierarchy. The primary spreadsheet contains a table or form-over-table layout that is based on the primary business object. Additional layouts may be created on separate spreadsheets; these are based on child business objects, relative to the primary business object, and grandchild, great-grandchild business objects, and so on, across n-levels of the object hierarchy.

At any level in the hierarchy, sibling objects may also be represented in their own spreadsheet. All of these dependent spreadsheets are linked/associated with their direct parent spreadsheet. Once those dependencies are established, the Download, Upload, and Clear operations act on all the linked spreadsheets in a coordinated fashion: e.g., starting with the primary, then going to its child layouts, siblings if any, then grandchild layouts, etc.

An example use case considers an object model (e.g., the object data model 40 of FIGS. 1-2) that is managed by one or more web services and/or APIs (e.g., the web service(s) or API(s) 24 of FIGS. 1-2). The example object model includes Expense Reports (which may represent a collection of top-level report documents, each representing the summary of a single expense report submitted for reimbursement), with child Expenses (e.g., indicating one or more expenses incurred for a given expense report), and one or more grandchild (child of the Expenses) Itemizations (e.g., itemizations for an expense, representing a collection of specific items/expenditures), and Payments, representing a child of the Expense Reports and a sibling of the Expenses.

Accordingly, each Expense Report may contain multiple Expenses and multiple Payments. Each Expense may be broken down into multiple Itemizations. Expenses and Payments are both direct children of Expense Report, so they are considered sibling objects.

Note that while the present example represents a simple hierarchy with a few levels (e.g., as shown in FIG. 3); the feature supports an arbitrary number of siblings/children/descendant objects in the hierarchy.

During configuration, separate layouts are configured for all of the business objects of interest in the hierarchy. This may take the form of separate worksheets showing rows for the data items from a single business object (e.g. Expenses). Once the individual layouts are created, the workbook developer enables the orchestration feature by establishing a linkage from each of the layouts to its direct parent layout.

For example, take the Expenses worksheet (e.g., the Expenses worksheet 148 of FIG. 6)—before establishing a linkage, the associated Parent Layout property or section is empty (e.g., corresponding to the Parent Layout section 98 of FIG. 4A). After setting the Parent Layout (in this case, to the worksheet with the Expense Reports business object), the Parent Layout property is updated, e.g., as shown in the updated Parent Layout section 108 of FIG. 4B. Similarly, a workbook developer may set up the Parent Layout for other siblings, children, grandchildren, and so on.

Note that in certain implementations, the configuration may be automatic. The workbook developer may simply choose a root business object and the spreadsheet add-in (e.g., the add-in 18 of FIGS. 1-2) configures separate spreadsheets/layouts for all the nodes in the business object hierarchy. In this implementation, all the linkages for each layout to its direct parent layout are automatically determined and set up by the add-in.

During runtime, once the workbook has been configured with a set of spreadsheets exposing part or all of the business object hierarchy, the add-in's high level Download, Upload, and Clear operations are automatically orchestrated across all of the spreadsheets for the business object hierarchy (as exposed in layouts on the separate spreadsheets).

For Download operations, with a single gesture (e.g., involving the click of a Download button, e.g., the Download button 138 of FIG. 13), all of the dependent spreadsheets are automatically populated without the need to supply any driving data relationship keys.

Such keys are automatically collected by the add-in for a given business object table and provided to drive the download for all child layouts (and so on for sibling, grandchild, and great-grandchild, etc. layouts). In contrast, without this feature, each worksheet may need to have its data downloaded separately, and each download operation may require the user to supply some data relationship key values (e.g., Expense Report ID, Expense ID) to drive the download. Furthermore, the downloaded rows at each level would be limited to those from a single parent (see note below). Embodiments discussed herein generally overcome such error-prone tedious tasks.

When editing data in a worksheet of a workbook that has been configured in accordance with certain embodiments discussed herein, at all levels of the hierarchy, the user is able to insert new table rows in order to create items, edit existing data to update items, mark items for deletion. By visiting each spreadsheet, the user has access to all of the business objects data and can analyze, sort, filter, chart, and make inserts and edits.

After editing data for one or more dependent business objects in the hierarchy, the end user can send all the changes to the web service with a single gesture (a click of the Upload ribbon button). The add-in then traverses the hierarchy of layouts and sends changes from each one in turn. When the upload is complete, the add-in provides a summary of results in the Status Viewer of the root layout. Detailed row-level results are available for all of the layouts: activate the particular spreadsheet to see the full details for those business object items.

This aspect of embodiments discussed herein provides another efficiency boost for users, such as accountants. In the case where conditions have changed or for some other reason the user wants to start fresh, the Clear button (e.g., the clear button 132 of FIG. 5), with a single gesture, automatically clears data from all the dependent spreadsheets in the hierarchy corresponding to the cleared rows in the given worksheet.

Note that one embodiments discussed herein are particularly useful or beneficial for facilitating orchestration for Download and Upload operations. For instance, at each child, sibling, grandchild, etc. level of the hierarchy of worksheets, the add-in (e.g., the add-in 18 of FIGS. 1-2) may retrieve all rows for all parent rows. Accordingly, for an Itemizations worksheet, the add-in may retrieve all Itemizations for all Expenses (and by extension, for all Expense Reports from the root layout).

This allows the user to analyze, filter, sort, graph, insert, and edit all Itemizations in a single spreadsheet table. Then, an Upload operation can send all changes (updates, creates, deletes) across the entire business object hierarchy (e.g., corresponding to the hierarchy 44 of FIGS. 1-3) in a single operation. This represents a significant efficiency enhancement for the accountant, who may otherwise need to perform multiple queries, multiple downloads, and copy/paste the resultant rows into a temporary sheet for analysis. Without use of embodiments discussed herein, a given Upload operation may be limited to a single table, where that table would only contain items for a single parent object.

Figure 22:
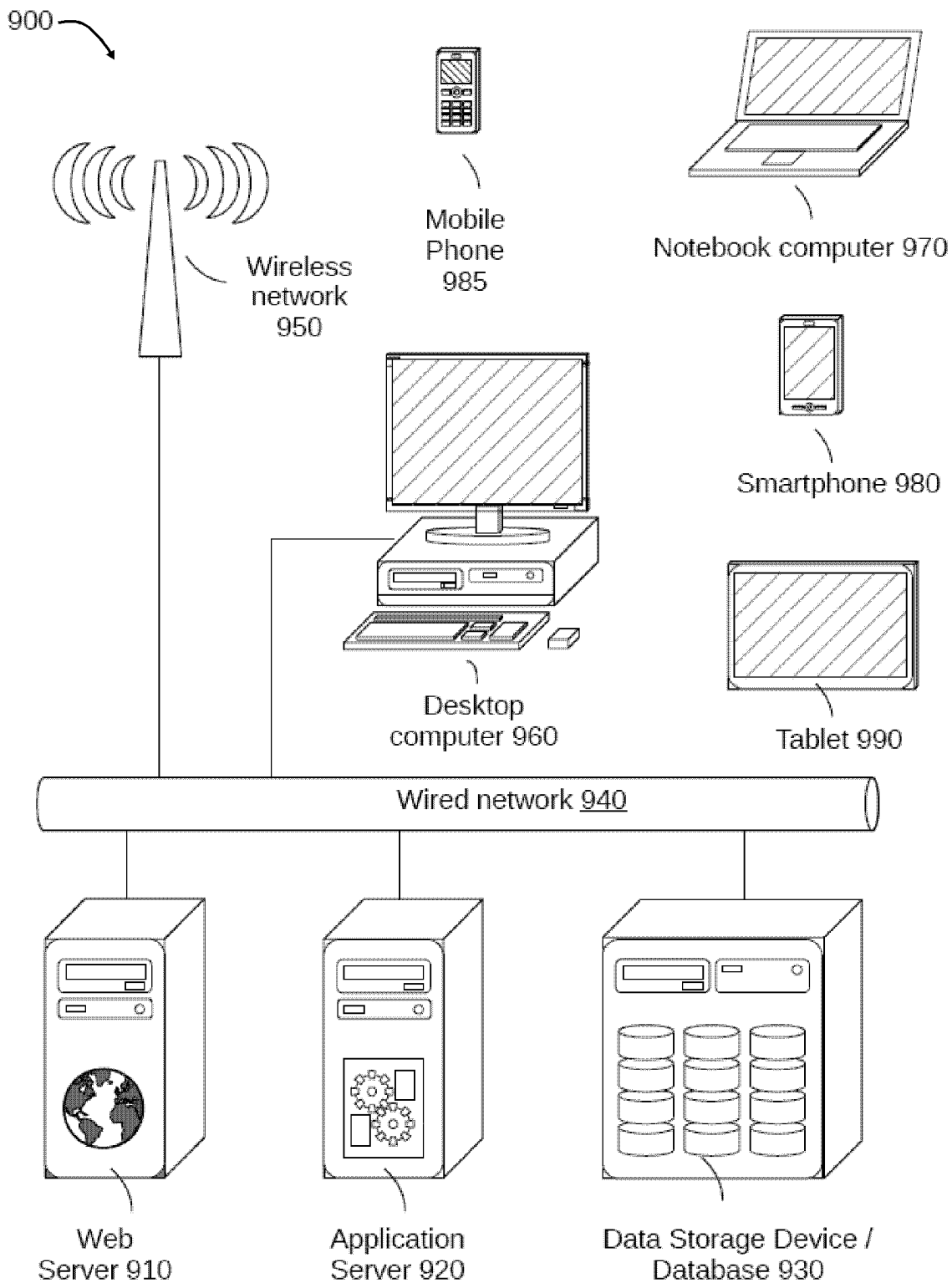
FIG. 22 illustrates a block diagram of an example network environment, which may be used for implementations described herein.

FIG. 22 is a general block diagram of a system 900 and accompanying computing environment usable to implement the embodiments of FIGS. 1-22. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can be created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 22, the client system(s) 12 of FIG. 1 may be implemented via one or more of the desktop computer 960, tablet 990, smartphone 980, notebook computer 970, and/or mobile phone 985 of FIG. 22. The server system 14 of FIG. 1 and accompanying modules 24, 44, 28-38 may be implemented via the web server 910 and/or application server 920 of FIG. 22. The backend databases 46 of FIG. 1 may be implemented using the data storage device 930 of FIG. 22.

Figure 23:
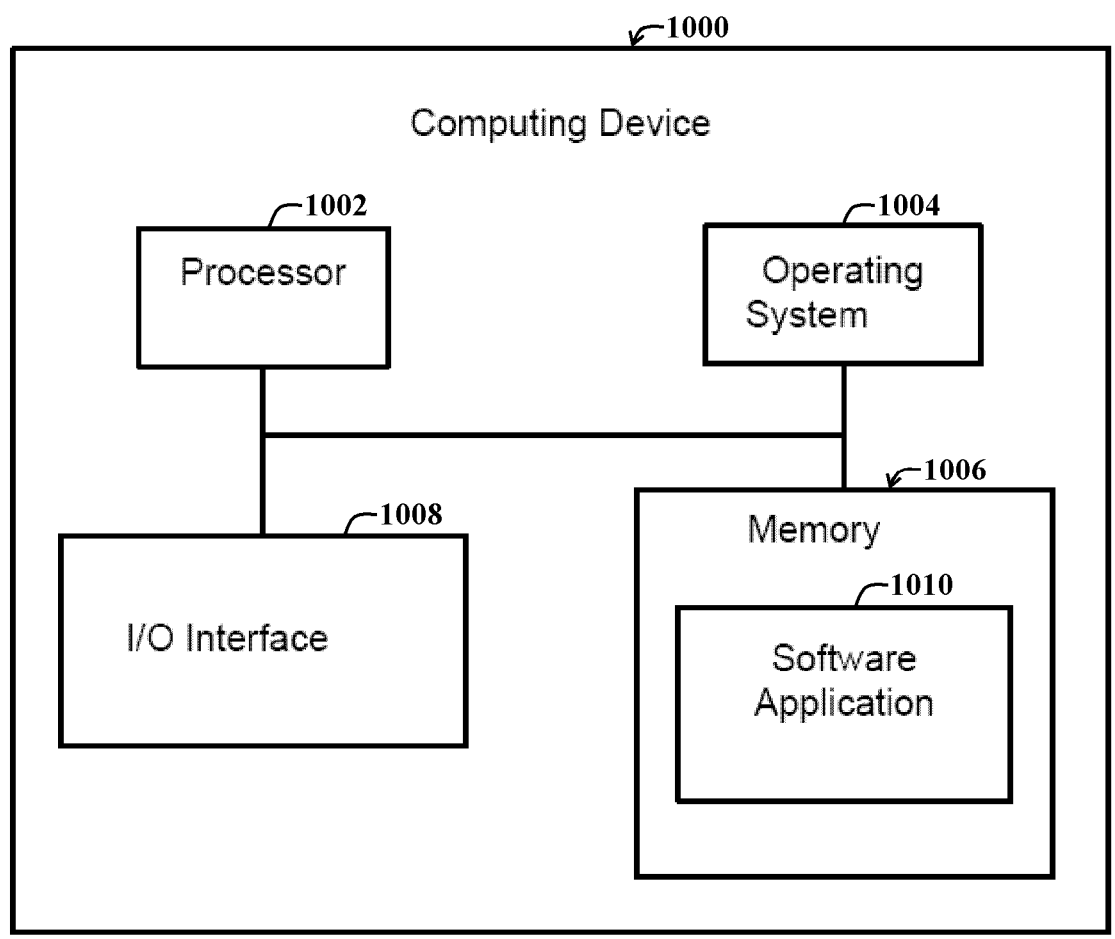
FIG. 23 illustrates a block diagram of an example computing device or system, which may be used for implementations described herein.

FIG. 23 illustrates a block diagram of an example computing device or system 500, which may be used for implementations described herein. For example, the computing device 1000 may be used to implement server devices 910, 920 of FIG. 22 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 23 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein mode server-side data hierarchical structures with client-side hierarchically associated or related spreadsheet worksheets, embodiments are not limited there to. Other types of data structures; not just hierarchical data structures may be used with embodiments discussed herein.

Furthermore, note that while a given business object at a given hierarchical level is discussed as corresponding to a given worksheet, embodiments are not limited thereto. For example, multiple hierarchical levels of a given business object hierarchy can be illustrated in a single worksheet, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A tangible processor-readable medium including instructions executable by one or more processors, and when executed operable for:
   automatically determining one or more characteristics of an organization of a data structure of a server-side data storage mechanism;
   using the one or more characteristics for automatically constructing a client-side spreadsheet and generating client-side worksheets;
   using the one or more characteristics to specify one or more relationships between the client-side worksheets of the client-side spreadsheet, such that the one or more relationships are specified in accordance with the organization of the data structure of the server-side data storage mechanism; and
   employing the one or more relationships, that are between the client-side worksheets of the client-side spreadsheet, to facilitate one or more operations on data of the data structure via the client-side spreadsheet, wherein the data structure is of the server-side data storage mechanism and the data structure has the organization.

2. The tangible processor-readable medium of claim 1, wherein employing further includes:
   facilitating the one or more operations on data of the data structure responsive to user input provided via one or more User Interface (UI) controls of the client-side spreadsheet.

3. The tangible processor-readable medium of claim 2, wherein the one or more UI controls include an Upload control.

4. The tangible processor-readable medium of claim 2, wherein the one or more UI controls include a Download control.

5. The tangible processor-readable medium of claim 1, wherein the one or more operations include one or more CRUD (Create, Read, Update, Delete) operations.

6. The tangible processor-readable medium of claim 5, wherein the one or more operations include one or more custom actions.

7. The tangible processor-readable medium of claim 1, wherein employing further includes:
   using the one or more relationships to selectively synchronize data in the client-side worksheets with data of the data structure.

8. The tangible processor-readable medium of claim 1, wherein the organization of the data structure includes a hierarchy of data objects; wherein the hierarchy of data objects includes a tree structure; and wherein the one or more relationships between the client-side worksheets are described, at least in part, by the tree structure or a portion thereof.

9. The tangible processor-readable medium of claim 8, wherein the one or more relationships match one or more associations between one or more data objects of the data structure, such that the client-side worksheets are related as a hierarchy of worksheets, wherein the hierarchy of worksheets is based on the hierarchy of data objects.

10. The tangible processor-readable medium of claim 9, wherein employing includes traversing the hierarchy of worksheets to selectively implement one or more actions specified in one or more of the worksheets to thereby perform actions specified in the one or more worksheets on corresponding data objects of the hierarchy of data objects.

11. A method for facilitating communications between a client-side spreadsheet and a server-side data storage mechanism, the method comprising:
   automatically determining one or more characteristics of an organization of a data structure of a server-side data storage mechanism;
   using the one or more characteristics for automatically constructing a client-side spreadsheet and generating client-side worksheets;
   using the one or more characteristics to specify one or more relationships between the client-side worksheets of the client-side spreadsheet, such that the one or more relationships are specified in accordance with the organization of the data structure of the server-side data storage mechanism; and
   employing the one or more relationships, that are between the client-side worksheets of the client-side spreadsheet, to facilitate one or more operations on data of the data structure via the client-side spreadsheet, wherein the data structure is of the server-side data storage mechanism and has the organization.

12. The method of claim 11, wherein employing further includes:
   facilitating the one or more operations on data of the data structure responsive to user input provided via one or more User Interface (UI) controls of the client-side spreadsheet.

13. The method of claim 12, wherein the one or more UI controls include an Upload control.

14. The method of claim 12, wherein the one or more UI controls include a Download control.

15. The method of claim 11, wherein the one or more operations include one or more CRUD (Create, Read, Update, Delete) operations.

16. The method of claim 15, wherein the one or more operations include one or more custom actions.

17. The method of claim 11, wherein employing further includes:
   using the one or more relationships to selectively synchronize data in the client-side worksheets with data of the data structure.

18. The method of claim 11, wherein the organization of the data structure includes a hierarchy of data objects; wherein the hierarchy of data objects includes a tree structure; and wherein the one or more relationships between the client-side worksheets are described, at least in part, by the tree structure or a portion thereof.

19. The method of claim 18, wherein the one or more relationships match one or more associations between one or more data objects of the data structure, such that the client-side worksheets are related as a hierarchy of worksheets, wherein the hierarchy of worksheets is based on the hierarchy of data objects, and wherein employing includes:
   traversing the hierarchy of worksheets to selectively implement one or more actions specified in one or more of the worksheets to thereby perform actions specified in the one or more worksheets on corresponding data objects of the hierarchy of data objects.

20. An apparatus comprising:

one or more processors; and logic encoded in one or more tangible media for execution by the one or more processors and when executed operable for:

automatically determining one or more characteristics of an organization of a data structure of a server-side data storage mechanism;

using the one or more characteristics for automatically constructing a client-side spreadsheet and generating client-side worksheets;

using the one or more characteristics to specify one or more relationships between the client-side worksheets of the client-side spreadsheet, such that the one or more relationships are specified in accordance with the organization of the data structure of the server-side data storage mechanism; and employing the one or more relationships, that are between the client-side worksheets of the client-side spreadsheet, to facilitate one or more operations on data of the data structure via the client-side spreadsheet, wherein the data structure is of the server-side data storage mechanism and has the organization.

* * * * *